United States Patent
Sato et al.

(10) Patent No.: US 9,914,458 B2
(45) Date of Patent: Mar. 13, 2018

(54) CONTROL SYSTEM OF AUTOMATED DRIVING VEHICLE

(71) Applicant: TOYOTA JIDOSHA KABUSHIKI KAISHA, Toyota-shi, Aichi-ken (JP)

(72) Inventors: Kazuki Sato, Susono (JP); Kazuhiro Sugimoto, Susono (JP); Junichi Tanaka, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/200,221

(22) Filed: Jul. 1, 2016

(65) Prior Publication Data

US 2017/0008522 A1 Jan. 12, 2017

(30) Foreign Application Priority Data

Jul. 6, 2015 (JP) ................................. 2015-135313

(51) Int. Cl.
*B60W 30/18* (2012.01)
*B60W 30/09* (2012.01)
(Continued)

(52) U.S. Cl.
CPC .......... *B60W 30/182* (2013.01); *B60W 10/04* (2013.01); *B60W 10/18* (2013.01); *B60W 10/20* (2013.01); *B60W 30/095* (2013.01); *B60W 30/16* (2013.01); *B60W 30/17* (2013.01); *B60W 30/18163* (2013.01); *G05D 1/0088* (2013.01);
(Continued)

(58) Field of Classification Search
CPC .... B60W 30/182; B60W 10/04; B60W 10/20; B60W 30/04; B60W 30/16; B60W 30/17; B60W 30/18163; G05D 1/0088; G05D 1/0212
See application file for complete search history.

(56) References Cited

U.S. PATENT DOCUMENTS 8,301,343 B2* 10/2012 Tanimoto .................. B60T 7/12
180/271
2016/0311323 A1* 10/2016 Lee ........................ B60K 37/06
(Continued)

FOREIGN PATENT DOCUMENTS

| JP | H07-108849 A | 4/1995 |
|---|---|---|
| JP | 2001-004745 A | 1/2001 |

(Continued)

*Primary Examiner* — Rodney A Butler
(74) *Attorney, Agent, or Firm* — Andrews Kurth Kenyon LLP

(57) ABSTRACT

At the time of automated driving, a plurality of vehicle running paths which show changes along with time of a speed and advancing direction of the vehicle are generated based on the information on the surroundings of the vehicle which is detected by an external sensor. At the time of a manual driving mode, the running paths of the vehicle at the different driving scenes are stored as specific vehicle running paths which show the driving characteristics of the driver. At the time of automated driving, when the driving scene becomes a driving scene for which the specific vehicle running path is stored, a vehicle running path close to the stored specific vehicle running path is selected from among the plurality of generated vehicle running paths, and the vehicle is automatically driven along this selected vehicle running path.

6 Claims, 16 Drawing Sheets

(51) Int. Cl.
*B60W 10/04* (2006.01)
*B60W 10/20* (2006.01)
*G05D 1/00* (2006.01)
*B60W 30/182* (2012.01)
*B60W 30/095* (2012.01)
*B60W 30/17* (2012.01)
*B60W 10/18* (2012.01)
*B60W 30/16* (2012.01)
*G05D 1/02* (2006.01)
*G08G 1/0967* (2006.01)
*B60W 50/00* (2006.01)

(52) U.S. Cl.
CPC ..... *G05D 1/0212* (2013.01); *G08G 1/096783* (2013.01); *G08G 1/096791* (2013.01); *B60W 2050/0088* (2013.01); *B60W 2050/0089* (2013.01); *B60W 2550/30* (2013.01); *B60W 2710/18* (2013.01); *B60W 2710/20* (2013.01); *B60W 2720/10* (2013.01); *G05D 2201/0213* (2013.01)

(56) References Cited

U.S. PATENT DOCUMENTS

2017/0003683 A1* 1/2017 Sato .................... G05D 1/0061
2017/0096145 A1* 4/2017 Bahn ..................... E05F 15/70

FOREIGN PATENT DOCUMENTS

JP          2003-162799 A    6/2003
JP          2013-129328 A    7/2013

* cited by examiner $$A(n) = \frac{V(n+1) - V(n)}{\Delta t}$$

$$AX = g \cdot \sin\theta$$

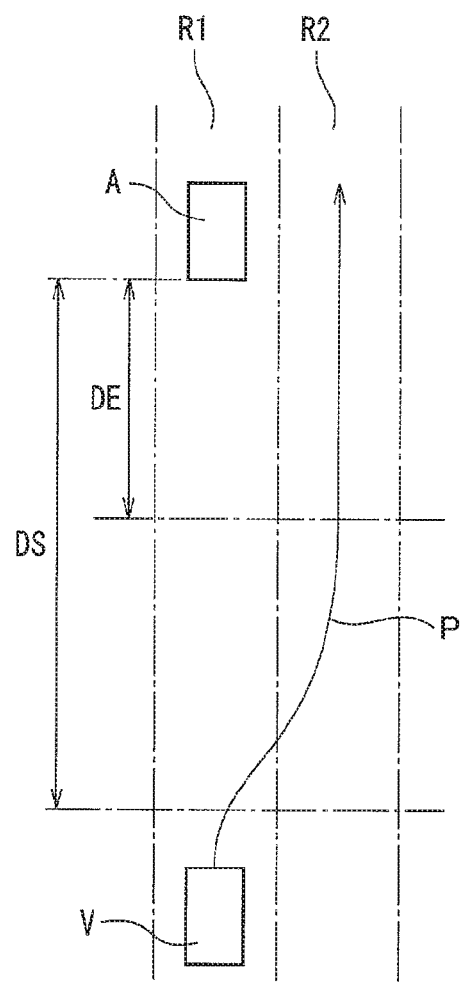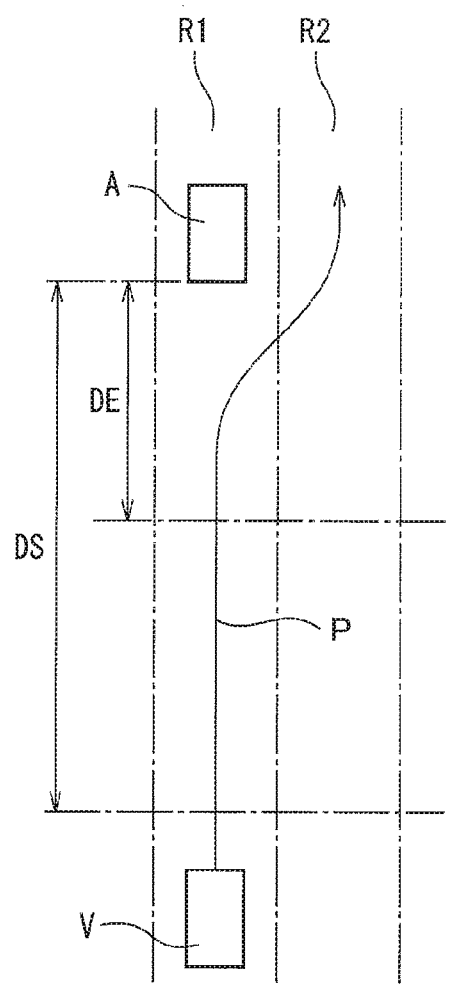

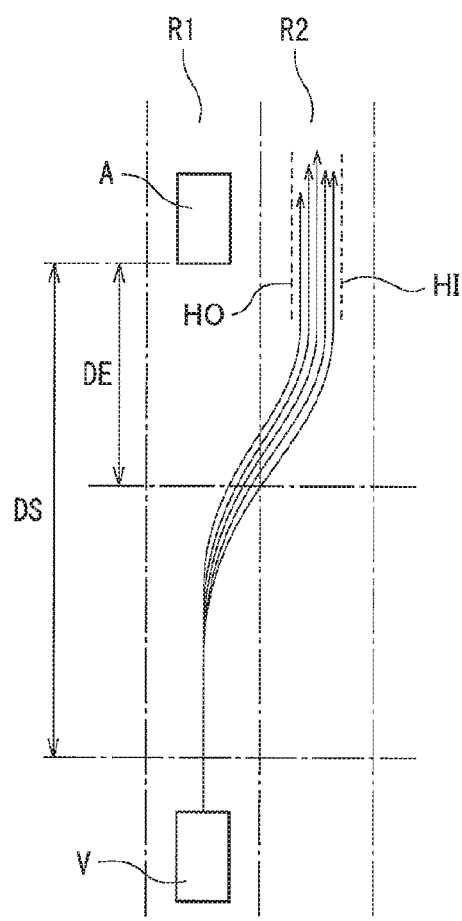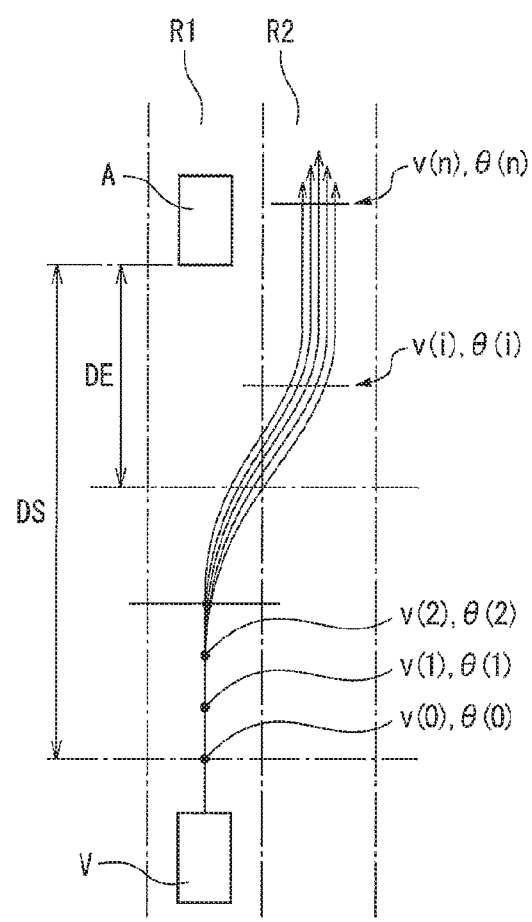

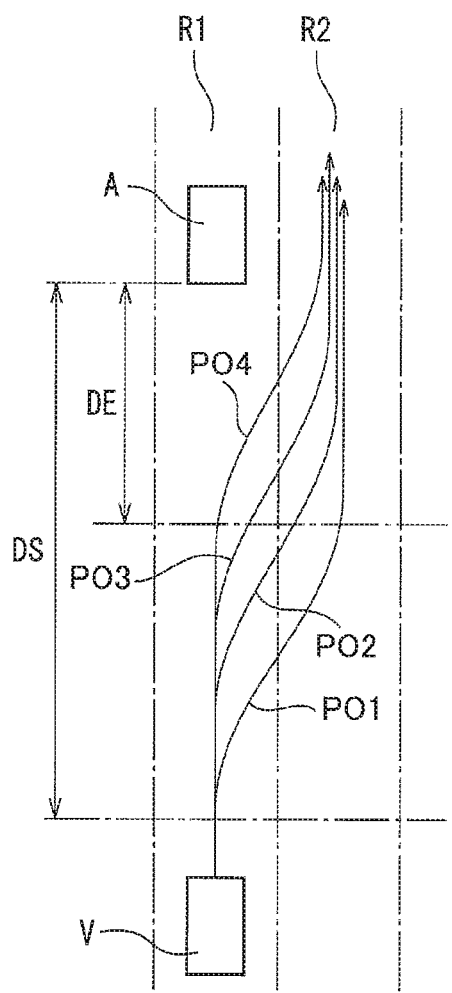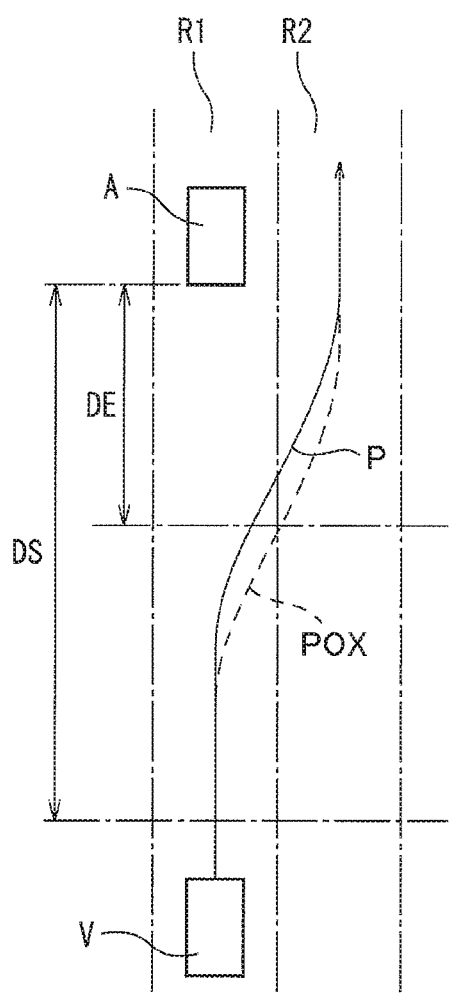

FIG. 16A

| RUNNING SCENE 1 | |
|---|---|
| VEHICLE V | V(1), V(2), ··· V(i), ··· V(n) |
| SPEED DIFFERENCE ΔV | ΔV(1), ΔV(2), ··· ΔV(i), ··· ΔV(n) |
| VISIBILITY | F(1), F(2), ··· F(i), ··· F(m) |
| WEATHER | C(1), C(2), ··· C(i), ··· C(m) |
| ROAD CONDITIONS | R(1), R(2), ··· R(i), ··· R(m) |

FIG. 16B

| RUNNING SCENE 2 | |
|---|---|
| VEHICLE V | V(1), V(2), ··· V(i), ··· V(n) |
| VISIBILITY | F(1), F(2), ··· F(i), ··· F(m) |
| WEATHER | C(1), C(2), ··· C(i), ··· C(m) |
| ROAD SURFACE | R(1), R(2), ··· R(i), ··· R(m) |

CONTROL SYSTEM OF AUTOMATED DRIVING VEHICLE

CROSS-REFERENCE TO RELATED APPLICATION

The present application claims priority to Japanese Patent Application No. 2015-135313 filed on Jul. 6, 2015, which is incorporated herein by reference in its entirety.

TECHNICAL FIELD

The present invention relates to a control system of an automated driving vehicle.

BACKGROUND ART

In an automated running control system of a vehicle, known in the art is an automated running control system in which two driving modes are provided—an automated running control mode for automated running control and a learning driving mode for learning the driving operations of a driver. In the learning driving mode, the driving operations corresponding to the preferences of individual drivers are respectively learned and the learning results for each driver are stored in a storage device and, in the automated running control mode, learning data corresponding to the preferences of the driver is read out from the storage device and an automated running control of the vehicle is performed in accordance with the control content corresponding to the learning data (see for example Japanese Patent Publication No. 7-108849A).

In such an automated running control system of a vehicle, at the time of the learning driving mode, for example, driving operations which correspond to the preferences of individual drivers relating to the relationship between the vehicle-to-vehicle distance and the vehicle speed, the relationship between the brightness of the surroundings and the vehicle-to-vehicle distance, the relationship between the brightness of the surroundings and the vehicle speed, the relationship between the amount of rain and the vehicle speed, the relationship between the strength of the side winds and the vehicle speed, etc. are learned and stored in a storage device. At the time of the automated running control mode, the automated driving is controlled so that driving operations are performed corresponding to the preferences of the individual driver relating to these relationship between the vehicle-to-vehicle distance and the vehicle speed, relationship between the brightness of the surroundings and the vehicle-to-vehicle distance, relationship between the brightness of the surroundings and the vehicle speed, relationship between the amount of rain and the vehicle speed, and relationship between the strength of the side winds and the vehicle speed.

SUMMARY

Technical Problem

However, this automated running control system of a vehicle merely individually controls just single values of the vehicle-to-vehicle distance and the vehicle speed, but does not suggest an idea of complexly controlling the speed and advancing direction of the vehicle and the changes of these parameters along with time so as to perform control corresponding to the driving characteristics of the driver at all.

Embodiments of the present invention provide a control system of an automated driving vehicle which can complexly control the speed and advancing direction of the vehicle and the changes of these parameters along with time and thereby can perform control corresponding to the driving characteristics of the driver.

Solution to Problem

That is, according to an embodiment of the present invention, there is provided a control system of an automated driving vehicle comprising an external sensor which detects information of surroundings of a host vehicle, a storage device which stores map information, and an electronic control unit. The electronic control unit includes a driving plan generation unit which generates a plurality of vehicle running paths which show changes along with time of a speed and advancing direction of the host vehicle based on the map information stored in the storage device and the information of surroundings of the host vehicle which is detected by the external sensor and decides on a single vehicle running path from among these plurality of vehicle running paths. A driving scene judgment unit is provided which judges a driving scene of the vehicle based on the information of the surroundings of the host vehicle which is detected by the external sensor. A driving mode switching unit is provided which switches a driving mode of the host vehicle between a manual driving mode where the vehicle is driven by operations of the driver and an automated driving mode where the vehicle is driven without operations of the driver. A storage unit is also provided which stores a running path of the host vehicle in a preset driving scene at the time of the manual driving mode as a specific vehicle running path which represents the driving characteristics of the driver in the preset driving scene. At the time of the automated driving mode, the driving plan generation unit selects a vehicle running path from the plurality of vehicle running paths when the driving scene becomes a driving scene for which the specific vehicle running path is stored in such a way that the selected vehicle running path is closer to the specific vehicle running path compared with the single vehicle running path which is determined by the driving plan generation unit when no specific vehicle running path is stored, and the driving plan generation unit makes the host vehicle be automated driven along with the selected vehicle running path.

Advantageous Effects of Embodiment of the Invention

Since it is possible to complexly control the speed and advancing direction of a host vehicle and changes of these parameters along with time so as to reflect the driving characteristics of a driver into the automated driving, it is possible to realize an automated driving with little feeling of oddness to the driver.

BRIEF DESCRIPTION OF DRAWINGS

FIGS. 8A and 8B are views which show examples of driving patterns of a vehicle in the driving scene 1.

FIGS. 12A and 12B are views which show examples of driving patterns of a vehicle in the driving scene 1.

FIGS. 13A and 13B are views which show examples of driving patterns of a vehicle in the driving scene 1.

FIGS. 16A and 16B are respectively views which show the coefficient values for learning permission ranges in the driving scene 1 and the driving scene 2.

DESCRIPTION OF EMBODIMENTS

Figure 1:
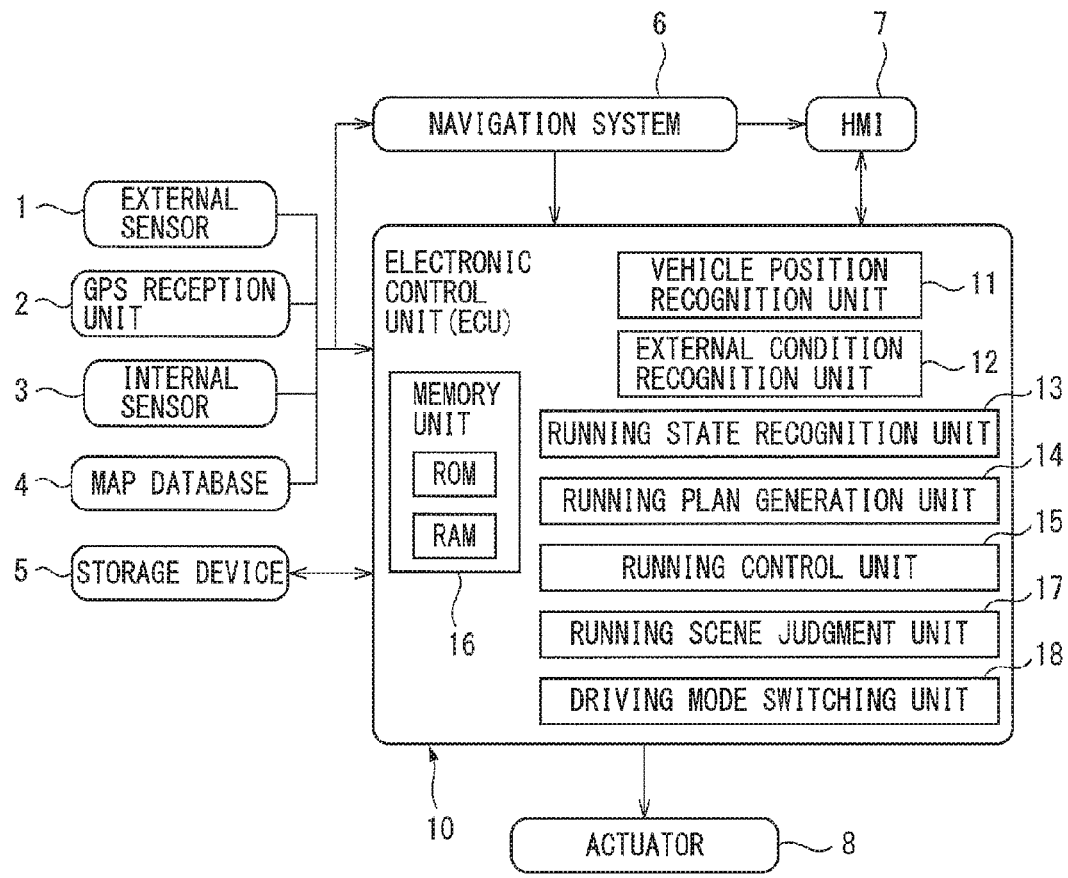
FIG. 1 is a block diagram which shows the overall configuration of an automated driving system of a vehicle according to the present invention.

FIG. 1 is a block diagram which shows the overall configuration of an automated driving system of a vehicle according to embodiments of the present invention. Referring to FIG. 1, this automated driving system of a vehicle comprises an external sensor 1 which detects information of surroundings of a host vehicle V, a GPS (global positioning system) reception unit 2, an internal sensor 3, a map database 4, a storage device 5, a navigation system 6, an HMI (human machine interface) 7, various actuators 8, and an electronic control unit (ECU) 10. Note that in this specification, the vehicle which is controlled by the automated driving system according to the present invention will be hereinafter referred to as "the host vehicle V" or simply "vehicle V".

Figure 2:
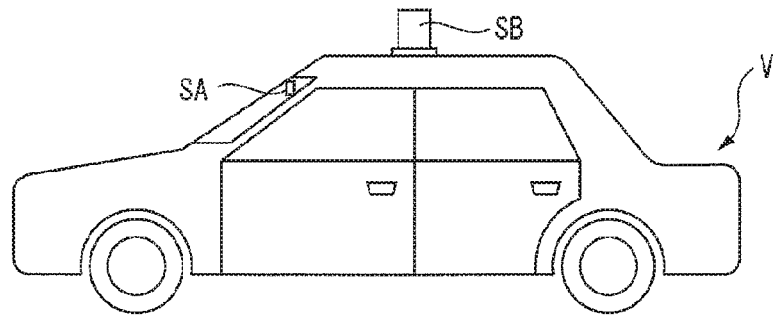
FIG. 2 is a side view of a vehicle.

In FIG. 1, the external sensor 1 shows a detection device for detecting information on the surroundings of the host vehicle V, that is, the external conditions. This external sensor 1 includes at least one of a camera, radar, and LIDAR (laser imaging detection and ranging device). The camera, for example, as shown in FIG. 2 by the reference notation SA, is provided at a back side of a front windshield of the vehicle V. This camera SA captures an image of the front of the vehicle V. The captured information of this camera SA is sent to the electronic control unit 10. On the other hand, radar is a device which utilizes radio waves to detect obstacles at the outside of the vehicle V. This radar detects obstacles around the vehicle V from the reflected waves of radio waves which are emitted from the radar to the surroundings of the vehicle V. Obstacle information which is detected by the radar is sent to the electronic control unit 10.

LIDAR is a device which utilizes laser beams to detect the road on which the host vehicle V is running and outside obstacles. This LIDAR, for example, as shown in FIG. 2 by the reference notation SB, is installed on the roof of the vehicle V. In this LIDAR SB, the distance to the road and obstacles around the road are measured from the reflected light of the laser beams which are successively fired toward the overall surroundings of the vehicle V, and the road and the presence of obstacles in the overall surroundings of the vehicle V are detected in the form of a three-dimensional image. The three-dimensional image of the road and obstacles which are detected by this LIDAR SB are sent to the electronic control unit 10.

In FIG. 1, in the GPS reception unit 2, signals are received from three or more GPS satellites and thereby the absolute position of the host vehicle V (for example, the latitude and longitude of the vehicle V) is detected. The absolute position information of the vehicle V which is detected by the GPS reception unit 2 is sent to the electronic control unit 10.

In FIG. 1, the internal sensor 3 shows a detection device for detecting the running state of the host vehicle V. This internal sensor 3 includes at least one of a vehicle speed sensor, acceleration sensor, and yaw rate sensor. The vehicle speed sensor is a detector which detects the speed of the vehicle V. The acceleration sensor, for example, is a detector which detects an acceleration in a front-rear direction of the vehicle V. The yaw rate sensor is a detector which detects a rotational angular speed about a vertical axis of the center of gravity of the vehicle V. The information which is detected by the vehicle speed sensor, acceleration sensor, and yaw rate sensor are sent to the electronic control unit 10.

In FIG. 1, the map database 4 shows a generally commercially available database relating to map information. This map database 4 is stored in, for example, an HDD (hard disk drive) which is mounted in the vehicle. The map information includes, for example, position information of the road, information of the road shape (for example, type such as curved or straight, curvature of curve, etc.), and position information of intersections and forks.

In FIG. 1, the storage device 5 stores three-dimensional images of obstacles which were detected by the LIDAR SB and road maps for the exclusive use of automated driving, which were prepared based on results of detection of the LIDAR SB. These three-dimensional images of the obstacles and road maps are constantly or periodically updated. Note that, in the embodiment shown in FIG. 1, the storage device 5 stores the three-dimensional images of obstacles when the vehicle is being driven at the exact center of a preselected driving lane.

In FIG. 1, the navigation system 6 is a device which guides the driver of the vehicle V to a destination which is set by the driver. In this navigation system 6, a target route to the destination is calculated based on the current position information of the host vehicle V which is measured by the GPS reception unit 2 and the map information of the map database 4. This information of the target route of the vehicle V is sent to the electronic control unit 10.

In FIG. 1, the HMI 7 shows an interface for output and input of information between the driver of the vehicle V and the automated driving system of the vehicle V. This HMI 7 is provided with, for example, a display panel for displaying image information to the driver, a speaker for voice output, and operation buttons or a touch panel etc. for the driver to input instructions. In the HMI 7, if the driver inputs an instruction to start the automated driving, a signal is sent to the electronic control unit 10 whereby the automated driving is started resulting in the automated driving mode where the vehicle is driven without operations of the driver. On the other hand, in the HMI 7, if the driver inputs an instruction to stop the automated driving, a signal is sent to the electronic control unit 10 whereby the automated driving is stopped resulting in the automated driving mode being switched to the manual driving mode where the vehicle is driven by operations of the driver. Note that, if the driver turns a steering wheel or depresses an accelerator pedal at the time of the automated driving mode, the automated driving mode is switched to the manual driving mode at this time as well.

In FIG. 1, the actuator 8 is provided for performing the running control of the vehicle V. This actuator 8 includes at least an accelerator actuator, brake actuator, and steering wheel actuator. The accelerator actuator controls a throttle opening degree in accordance with a control signal from the electronic control unit 10 and thereby controls a drive force of the vehicle V. The brake actuator controls the amount of depression of a brake pedal in accordance with a control signal from the electronic control unit 10 and thereby controls a braking force given to the wheels of the vehicle V. The steering wheel actuator controls the drive of a steering assist motor of an electric power steering system in accordance with a control signal from the electronic control unit 10 and thereby controls a steering action of the vehicle V.

The electronic control unit 10 comprises a CPU (central processing unit), ROM (read only memory), RAM (random access memory), etc. which are connected to each other by a bidirectional bus. Note that, FIG. 1 shows the case of using a single electronic control unit 10, but a plurality of electronic control units can also be used. As shown in FIG. 1, the electronic control unit 10 comprises a vehicle position recognition unit 11, external condition recognition unit 12, running state recognition unit 13, driving plan generation unit 14, running control unit 15, storage unit 16, driving scene judgment unit 17, and driving mode switching unit 18. Note that, as shown in FIG. 1, the ROM and RAM configure the storage unit 16.

Now then, if using GPS, it is possible to recognize the absolute position of the vehicle V (latitude and longitude). Therefore, in the embodiment according to the present invention, the initial absolute position of the host vehicle V on the map of the map database 4 when automated driving is started is recognized at the vehicle position recognition unit 11 based on the position information of the host vehicle V which is received by the GPS reception unit 2. However, the position of the host vehicle V on the road in the map database 4 which is obtained using GPS is considerably off from the actual position of the host vehicle V on the road. Therefore, it is difficult to use the position of the host vehicle V which is obtained using GPS as the basis for automated driving. As opposed to this, the road map for the exclusive use of automated driving which is stored in the storage device 5 is accurate, and the position of the host vehicle V on this road map for the exclusive use of automated driving which is stored at the storage device 5 substantially completely matches the actual position of the host vehicle V. Therefore, in the embodiment according to embodiments of the present invention, the automated driving is performed based on the position of the host vehicle V on the road map for the exclusive use of automated driving which is stored at the storage device 5.

That is, in the embodiment according to embodiments of the present invention, at the vehicle position recognition unit 11, if the initial absolute position of the host vehicle V when automated driving is started is recognized based on the position information of the host vehicle V which is received at the GPS reception unit 2, after that, the external conditions of the host vehicle V is recognized at the external condition recognition unit 12, and the accurate position of the host vehicle V on the road map for the exclusive use of automated driving which is stored at the storage device 5 is recognized based on this external conditions. In this case, at the external condition recognition unit 12, the external conditions of the host vehicle V is recognized based on the results of detection by the external sensor 1 (for example, the captured information of the camera 8, the obstacle information from the radar, the three-dimensional images of the obstacles which are detected by the LIDAR SB, etc.). Note that, the external conditions include the positions of white lines of a driving lane with respect to the vehicle V, the position of the center of the lane with respect to the vehicle V, the width of the road, the shape of the road (for example, the curvature of the driving lane, the change in grade of the road surface, etc.), and the situation of obstacles around the vehicle V (for example, information differentiating stationary obstacles and moving obstacles, positions of obstacles with respect to the vehicle V, the direction of movement of obstacles with respect to the vehicle V, the relative speed of obstacles with respect to the vehicle V, etc.).

Explaining this in a bit more detail, in the embodiment according to the present invention, when the initial absolute position of the host vehicle V when the automated driving is started is recognized based on position information of the host vehicle V which is received at the GPS reception unit 2, the current accurate position of the host vehicle V on the road map which is stored in the storage device 5 is recognized by comparing the three-dimensional images of outside stationary obstacles which are stored in the storage device 5 based on the results of detection of the LIDAR SB and the current three-dimensional images of outside stationary obstacles which are detected by the LIDAR SB at the external condition recognition unit 12. Specifically speaking, the three-dimensional images of outside stationary obstacles which are detected using the LIDAR SB are shifted a little at a time to find the image position where these three-dimensional images are superposed over the three-dimensional images of the outside stationary obstacles which are stored in the storage device 5. The amount of shift of the three-dimensional images at this time expresses the amount of deviation of the vehicle V from the exact center of the driving lane on the road map which is stored in the storage device 5. Therefore, the current accurate position of the host vehicle V can be recognized based on this amount of deviation.

Note that, if the amount of deviation of the host vehicle V from the exact center of the driving lane is found in this way, when the automated driving of the vehicle V is started, the vehicle V is driven controlled so that the vehicle V runs at the exact center of the driving lane. The work of finding the image position where the three-dimensional images of outside stationary obstacles which are detected by the LIDAR SB are superposed on the three-dimensional images of outside stationary obstacles which are stored in the storage device 5 is continuously performed during the time at which the vehicle V is driven, and the host vehicle V is driven controlled so that the vehicle V runs at the exact center of the driving lane of the target route which is set by the driver. Note that, in this external condition recognition unit 12, by comparing the three-dimensional images of outside obstacles which are detected by the LIDAR SB (stationary obstacles and moving obstacles) and the three-dimensional images of outside stationary obstacles which are stored in the storage device 5, the presence of moving obstacles such as pedestrians is recognized.

In the running state recognition unit 13, the running state of the vehicle V is recognized based on the results of detection of the internal sensor 3 (for example, the vehicle speed information from the vehicle speed sensor, the acceleration information from the acceleration sensor, the rotational angular speed information of the yaw rate sensor, etc.). The running state of the vehicle V includes, for example, the vehicle speed, acceleration, and rotational angular speed about the vertical axis of the center of gravity of the vehicle V.

As explained above, the position of the vehicle V at the road map which is stored in the storage device 5 is recognized at the external condition recognition unit 12. In the driving plan generation unit 14, a driving plan of the host vehicle V along the target route which is set by the driver is prepared based on the position of the vehicle which is recognized by the external condition recognition unit 12, the external conditions of the vehicle which are recognized by the external condition recognition unit 12 (position, advancing direction, etc. of other vehicle), and the speed of the vehicle V, acceleration, etc. which are detected by the internal sensor 3, that is, the running path of the host vehicle V is determined. In this case, the vehicle running path is determined so as to reach the destination safely and in the shortest time while observing the law.

In the driving scene judgment unit 17, the driving scene of the vehicle is judged based on the information of the surroundings of the host vehicle V which is detected by the external sensor 1. The driving scenes which are covered by the judgment are set in advance, and, as preset driving scenes, there are a driving scene where the host vehicle V approaches another vehicle which is running in front of the host vehicle V and changes lanes to overtake the other vehicle and a driving scene where another vehicle which is running in front of the host vehicle V stops and the host vehicle V follows behind the other vehicle and stops. Which is the corresponding driving scene is judged from the motion of the host vehicle V and other vehicles.

In the driving mode switching unit 18, the driving mode of the vehicle V is switched to either the manual driving mode where the vehicle is driven by operations of the driver and the automated driving mode where the vehicle is driven without operations of the driver. In this case, there are a case where the switching action of the driving mode is performed by the switching operation of the manual driving mode and the automated driving mode at the HMI 6 by the driver and a case where the switching action of the driving mode is performed by the switching operation from the automated driving mode to the manual driving mode based on the operation of the steering and the operation of the accelerator pedal by the driver.

Next, a method of determining a typical running path of the host vehicle V at the driving plan generation unit 14 will be explained in brief with reference to FIG. 3 and FIG. 4.

Figure 3:
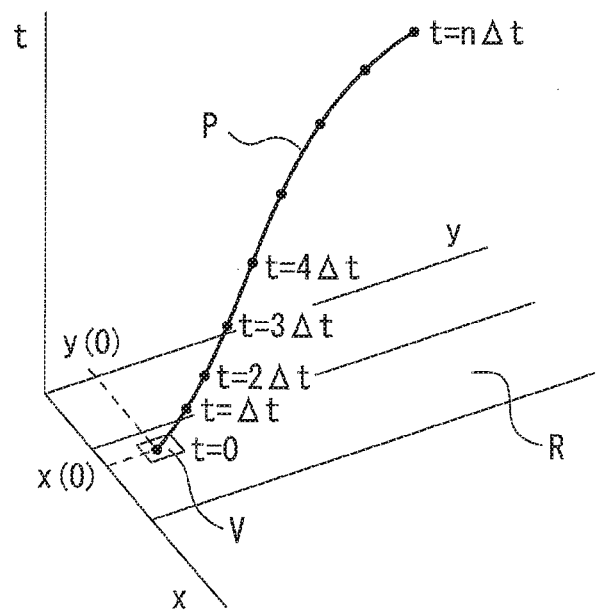
FIG. 3 is a view for explaining a trajectory of a vehicle running path.
Figure 4:
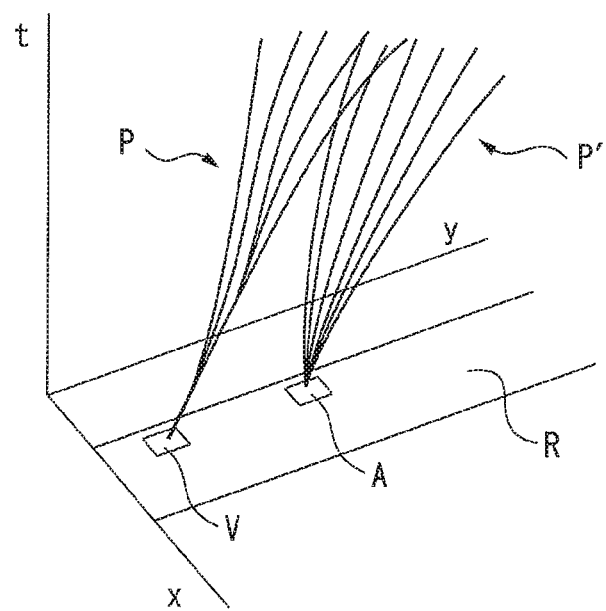
FIG. 4 is a view for explaining a trajectory of a vehicle running path.

FIG. 3 and FIG. 4 show a three-dimensional space where an axis perpendicular to the xy plane is made the time axis "t". The xy plane of FIG. 3 represents the ground surface in the road map which is stored in the storage device 5, and in FIG. 3, R indicates a road on the map which is stored at the storage device 5. Further, in FIG. 3, V indicates a host vehicle which is driving on the road R, and the y-axis direction on the xy plane is made the advancing direction of the host vehicle V. Note that, the positions of the road R and the host vehicle V in FIG. 3 perfectly match the actual positions of the road R and the host vehicle V on a one-to-one basis.

In the driving plan generation unit 14, as shown in FIG. 3 by P, a trajectory of a future running path of the host vehicle V in the three-dimensional space comprised of the xyz axes is generated. The initial position of this trajectory is the current position of the host vehicle V. The time t at this time is made zero (time t=0), while the position of the host vehicle V at this time is made the position (x(0), y(0)) on the road R of the road map which is stored in the storage device 5. Further, the running state of the host vehicle V is expressed by the vehicle speed v and advancing direction θ, while the running state of the host vehicle V at the time t=0 is made (v(0), θ(0)) on the road R of the road map which is stored in the storage device 5. In this way, in this embodiment according to the present invention, the position of the host vehicle V and the running state of the host vehicle V are made to change along with the advance of the vehicle V on the road map which is stored in the storage device 5.

Now then, the driving operations which are performed by the host vehicle V from the time t=0 until the Δt time (0.1 to 0.5 second) elapses are selected from among a preset plurality of operations. Giving a specific example, the acceleration of the vehicle is selected from a plurality of values which are preset in −10 to +30 km/h/sec in range, while the steering angular speed is selected from among a plurality of values which are preset in −7 to +7 degrees/sec in range. In this case, giving one example, for all combinations of a plurality of values of acceleration and a plurality of values of steering angular speed of the vehicle, the position (x(1), y(1)) of the host vehicle V and the running state (v(1), θ(1)) of the host vehicle V after the Δt time (t=Δt) are found, next the position (x(2), y(2)) of the host vehicle V and the running state (v(2), θ(2)) of the host vehicle V after a further Δt time, that is, after 2Δt time (t=2Δt), are found. Similarly, the position (x(n), y(n)) of the host vehicle V and the running state V (v(n), θ(n) of the host vehicle V after the not time (t=nΔt) are found.

In the driving plan generation unit 14, a plurality of the trajectories of the vehicle running paths are generated by connecting the positions (x, y) of the vehicle A which are found for the combinations of the plurality of values of acceleration and the plurality of values of steering angular speed of the vehicle V. In FIG. 3, "P" shows one representative trajectory among the thus obtained trajectories. If a plurality of the trajectories of the vehicle running paths are generated, for example a trajectory which is able to reach the destination safely and in the shortest time while observing the law is selected from among these trajectories, and this selected trajectory is determined as the advancing course of the host vehicle V. Note that, in FIG. 3, the projection on the xy plane on the road R of this trajectory becomes the vehicle running path of the host vehicle V on the road R of the road map which is stored in the storage device 5. The running path of the vehicle V on the road map which is stored in the storage device 5 becomes the actual running path of the vehicle V on the actual road.

Next, referring to FIG. 4, one example of the method of selecting a trajectory which is able to reach the destination safely and in the shortest time while observing the law from among these trajectories will be briefly explained. The xy plane of this FIG. 4, in the same way as in FIG. 3, also represents the ground surface on the road map which is stored in the storage device 5. Further, in FIG. 4, V, in the same way as in FIG. 3, shows the host vehicle, while A shows another vehicle in front of the host vehicle V which is advancing in the same direction as the vehicle V. Note that, in FIG. 4, the plurality of the trajectories P of the vehicle running paths which are generated for the host vehicle V are shown. Now then, in the driving plan generation unit 14, a plurality of the trajectories of the vehicle running paths for combinations of the plurality of values of acceleration of the vehicle and the plurality of values of steering angular speeds for the other vehicle A are generated as well. The plurality of the trajectories of the vehicle running paths which are generated for the other vehicle A are shown in FIG. 4 by P'.

In the driving plan generation unit 14, first, it is judged for all trajectories P, based on external information which is recognized by the external condition recognition unit 12, whether the host vehicle V can be driven on the road R and whether the host vehicle V will contact any fixed obstacle or pedestrian when the vehicle V is advancing according to a trajectory P. If it is judged that the vehicle V cannot be driven on the road R or if it is judged that the vehicle V will contact a fixed obstacle or pedestrian when the host vehicle V is advancing according to the trajectory P, that trajectory is excluded from the options and it is judged for the remaining trajectories P whether or not the host vehicle V interferes with the other vehicle A.

That is, in FIG. 4, when a trajectory P and a trajectory P' intersect, it means that at the intersecting time "t", the host vehicle V and the other vehicle A will collide. Therefore, if there is a trajectory P which intersects with a trajectory P' among the above-mentioned remaining trajectories P, the trajectory P which intersects with the trajectory P' is excluded from the options, and the trajectory P which enables the destination to be reached in the shortest time is selected from among the remaining trajectories P. In this way, the trajectory P which enables the destination to be reached safely and in the shortest time while observing the law is selected from the plurality of trajectories of the vehicle running path.

If the trajectory P is selected, the position $(x(1), y(1))$ of the vehicle V and the driving state $(v(1), \theta(1))$ of the vehicle V at the time $t=\Delta t$ on the selected trajectory P, the position $(x(2), y(2))$ of the vehicle V and the driving state $(v(2), \theta(2))$ of the vehicle V at the time $t=2\Delta t$ on the selected trajectory P, and the position $(x(n), y(n))$ of the vehicle V and the driving state $(v(n), \theta(n))$ of the vehicle V at the time $t=n\Delta t$ on the selected trajectory P are output from the driving plan generation unit 14, and in the driving control unit 15, the driving operation of the vehicle is controlled based on these positions of the vehicle V and driving states of the vehicle V.

Next, at the time $t=\Delta t$, the time "t" at this time is made zero (time $t=0$), the position of the vehicle V is made $(x(0), y(0))$, the driving state of the vehicle V is made $(v(0), \theta(0))$, a plurality of the trajectories P of the vehicle running path are generated again for the combinations of the plurality of values of acceleration of the vehicle and plurality of values of steering angular velocity, and the optimum trajectory P is selected from these trajectories P. If the optimum trajectory P is selected, the positions of the vehicle V and the driving states of the vehicle V at the times $t=\Delta t, 2\Delta t, \ldots n\Delta t$ on the selected trajectory P are output from the driving plan generation unit 14, and in the driving control unit 15, the driving operation of the vehicle is controlled based on these positions of the vehicle V and driving states of the vehicle V. After this operation is completed, the operation is repeated.

Figure 5:
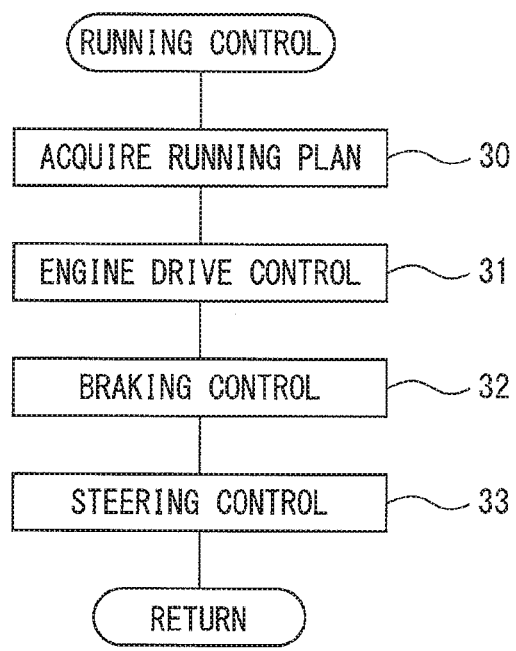
FIG. 5 is a flow chart for running control.

Next, the driving control which is performed based on the driving plan generated by the driving plan generation unit 14 will be briefly explained. Referring to FIG. 5 which shows the routine for performing this driving control of the vehicle, first, at step 30, the driving plan which is generated by the driving plan generation unit 14, that is, the positions $(x, y)$ of the vehicle V and the driving states $(v, \theta)$ of the vehicle V at the times from $t=\Delta t$ to $t=n\Delta t$ on the selected trajectory P are read in. Then, based on the positions $(x, y)$ of the vehicle V and the driving states $(v, \theta)$ of the vehicle V at these times, the drive control of the engine of the vehicle V and control of the engine auxiliaries etc. are performed at step 31, the control for braking the vehicle V and control of the braking lights etc. are performed at step 32, and the steering control and control of the direction lights etc. are performed at step 33. These controls are updated each time acquiring an updated new driving plan at step 30. In this way, automated driving of the vehicle V along the generated driving plan is performed.

Figure 6A:
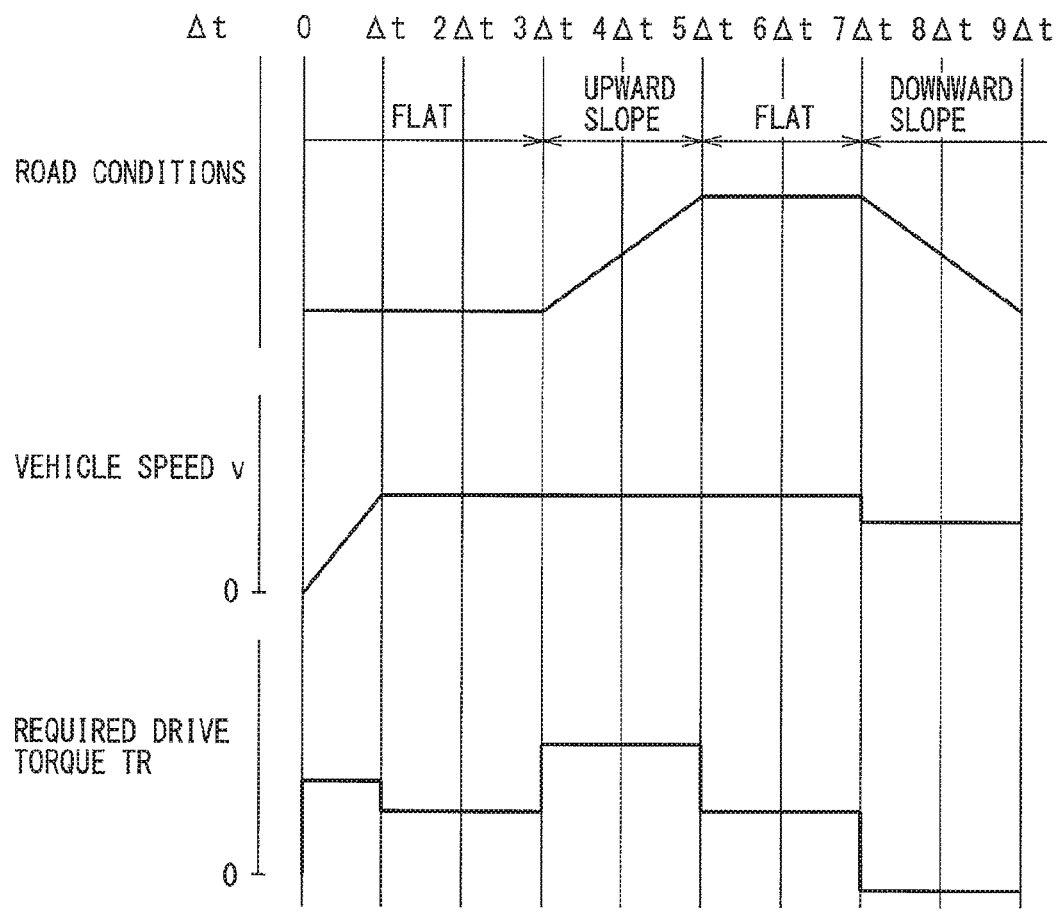
FIGS. 6A, 6B, and 6C are views for explaining a change of a required drive torque TR with respect to a vehicle V and a method of calculation of this required drive torque TR.

Next, while referring to FIG. 6A, one example of the drive control of an engine of the host vehicle V based on a driving plan which is generated by the driving plan generation unit 14 will be schematically explained. This FIG. 6A shows the road conditions, the vehicle speed "v" of the host vehicle V, and the required drive torque TR with respect to the vehicle V. Note that, in FIG. 6A, the vehicle speed "v" shows one example of the vehicle speed based on the driving plan from the driving plan generation unit 14. The example which is shown in FIG. 6A shows the case where the vehicle V is stopped at the time $t=0$, the vehicle V is accelerated in operation from the time $t=0$ to the time $t=\Delta t$, the vehicle is driven at a constant speed from the time $t=\Delta t$ to the time $t=7\Delta t$ even if the road becomes an upward slope midway, and the vehicle speed "v" is decreased at the downward slope after the time $t=7\Delta t$.

Figure 6B:
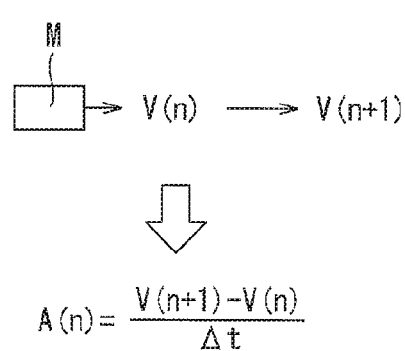

Now then, in an embodiment according to the present invention, the acceleration $A(n)$ in the direction of advance of the vehicle V, which should be applied to the vehicle V, is found from the vehicle speed "v" based on the driving plan generated by the driving plan generation unit 14, the required drive torque TR for the vehicle V is found from this acceleration $A(n)$, and the drive operation of the engine is controlled so that the drive torque for the vehicle V becomes this required drive torque TR. For example, as shown in FIG. 6B, if assuming that a vehicle of the mass M is accelerated from $v(n)$ to $v(n+1)$ during the time $\Delta t$, the acceleration $A(n)$ in the direction of advance of the vehicle at this time, as shown in FIG. 6B, is expressed by acceleration $A(n)=(v(n+1)-v(n))/\Delta t$. If assuming the force which acts on the vehicle V at this time to be F, this force F is expressed by the product $(=M \cdot A(n))$ of the mass M of the vehicle V and the acceleration $A(n)$. On the other hand, if making the radius of the drive wheels of the vehicle V to be "r", the drive torque TR for the vehicle V is expressed by $F \cdot r$. Therefore, the required drive torque TR for the vehicle V is expressed by $C \cdot A(n)$ $(=F \cdot r=M \cdot A(n) \cdot r)$ where C is a constant.

If the required drive torque $TR(=C \cdot A(n))$ for the vehicle V is found, the drive operation of the engine is controlled so that the drive torque with respect to the vehicle V becomes this required drive torque TR. Specifically speaking, the engine load, i.e., the opening degree of the throttle valve and the gear ratio of the transmission are controlled so that the drive torque with respect to the vehicle V becomes this required drive torque TR. For example, the gear ratio of the transmission is determined in advance as a function of the vehicle speed "v" and the required drive torque TR, and accordingly, if the vehicle speed "v" and the required drive torque TR are determined, the target gear ratio of the transmission is determined. If the target gear ratio of the transmission is determined, the engine speed and the engine output torque which give the vehicle speed "v" and the required drive torque TR are determined, and if the engine output torque is determined, the target opening degree of the throttle valve which gives this engine output torque is determined. In this way, the target gear ratio of the transmission and the target opening degree of the throttle valve are determined, and the gear ratio of the transmission and the opening degree of the throttle valve are controlled so as to become the target gear ratio of the transmission and the target opening degree of the throttle valve, respectively.

Figure 6C:
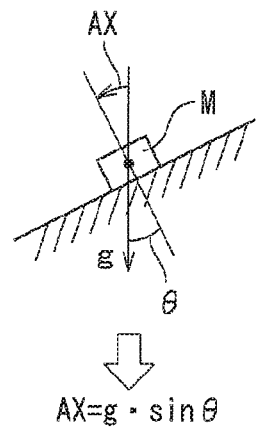

On the other hand, when the road is an upward slope, compared with the case of a flat road, a larger drive torque becomes required to drive the vehicle V. That is, as shown in FIG. 6C, on an upward slope, if making the acceleration of gravity "g" and the slope "θ", an acceleration AX (=g·SIN θ) acts on the vehicle V of the mass M in a direction causing the vehicle V to move backward. That is, a deceleration AX (=g·SIN θ) acts on the vehicle V. At this time, the required drive torque TR for the vehicle V which is required for preventing the vehicle V from moving backward is expressed by C·AX(=F·r=M·AX·r) where C is a constant. Therefore, when the vehicle V is being driven on an upward slope, the required drive torque TR for the vehicle V is made to increase by exactly this drive torque C·AX.

Therefore, in the example which is shown in FIG. 6A, the required drive torque TR for the vehicle V is increased during the period of the time t=0 to the time t=Δt when the vehicle V is being operated under acceleration, the required drive torque TR for the vehicle V is decreased somewhat during the period of the time t=Δt to the time t=3Δt when the vehicle V is being driven on a flat road, the required drive torque TR for the vehicle V is greatly increased during the period of the time t=3Δt to the time t=5Δt when the vehicle V is being driven on an upward slope at a constant speed, the required drive torque TR for the vehicle V is decreased, compared with when being driven on an upward slope at a constant speed, during the period from the time t=5Δt to the time t=7Δt when the vehicle V is being driven on a flat road at a constant speed, and the required drive torque TR for the vehicle V is further decreased during the period after the time t=7Δt when the vehicle V is being driven on a downward slope while decelerated somewhat.

Figure 7:
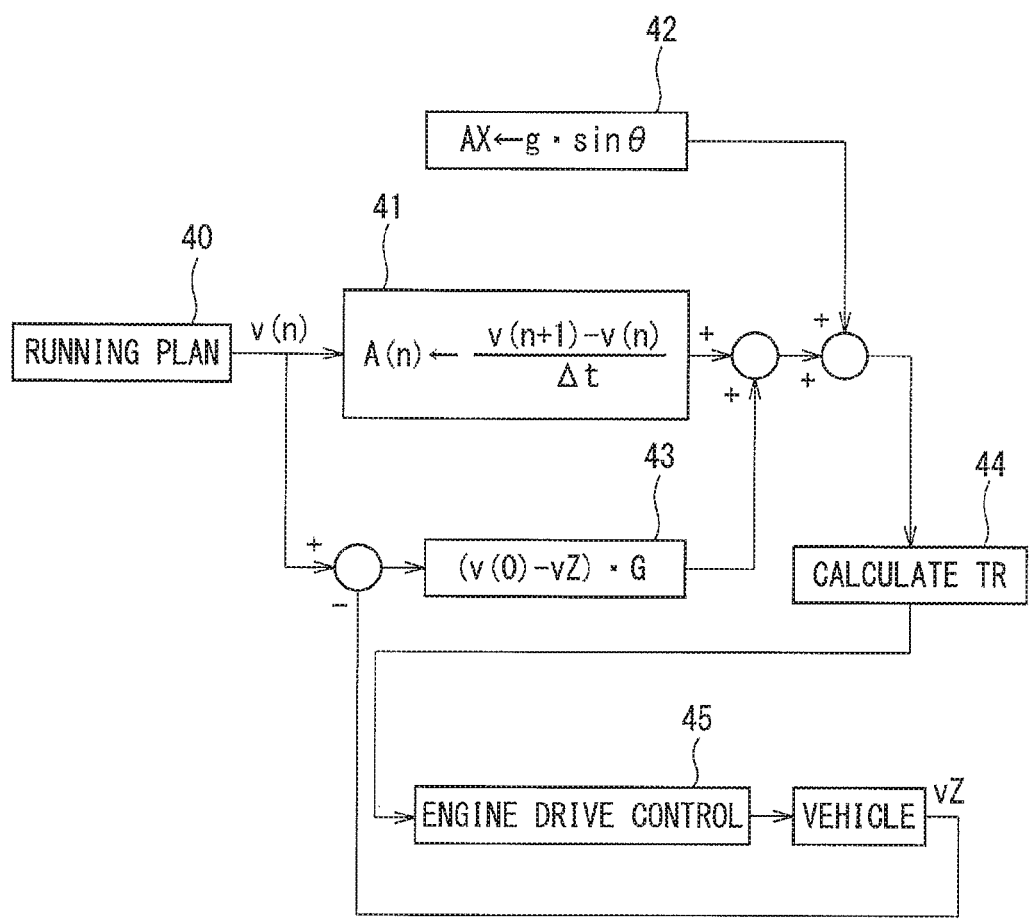
FIG. 7 is a view of the control structure of engine drive control based on a driving plan of a vehicle.

FIG. 7 shows a view of the control structure of the engine drive control based on a driving plan of the vehicle. If the vehicle speed at the current time (time=0) which is generated based on the driving plan 40 is made "v(0)", in an embodiment according to the present invention, feed forward control which controls the vehicle speed at the time t=Δt after the Δt time to the vehicle speed v(1) generated based on the driving plan 40 and feedback control which controls the actual vehicle speed to the vehicle speed "v" generated based on the driving plan 40 are performed simultaneously in parallel. In this case, it is difficult to understand these feed forward control and feedback control if explained simultaneously, so first the feed forward control will be explained, then the feedback control will be explained.

Referring to FIG. 7, in the feed forward control unit 41, the acceleration $A(0)=(v(1)-v(0))/\Delta t$ in the direction of advance of the vehicle V when changing the vehicle speed from v(0) to v(1) is calculated based on the vehicle speed v(0) at the current time (time t=0) which is generated based on the driving plan 40 and the vehicle speed v(1) at the time t=Δt which is generated based on the driving plan 40. On the other hand, in the slope correction unit 42, the acceleration AX (=g·SIN θ) at the upward slope or downward slope which was explained referring to FIG. 6C is calculated. Acceleration A(0) obtained by the feed forward control unit 41 and acceleration AX obtained by the slope correction unit 43 are added, and in the calculation unit 44 of the required drive torque TR, the required drive torque TR for the vehicle V is calculated from the sum (A(0)+AX) of the acceleration A(0) obtained by the feed forward control unit 41 and the acceleration AX obtained by the slope correction unit 42.

This sum (A(0)+AX) of the acceleration expresses the acceleration which is required for making the vehicle speed change from v(0) to v(1). Therefore, if changing the required drive torque TR for the vehicle V based on this sum (A(0)+AX) of acceleration, the vehicle speed at the time t=Δt is calculated as becoming v(1). Therefore, in the next engine drive control unit 45, the drive operation of the engine is controlled so that the drive torque for the vehicle V becomes this required drive torque TR and thereby the vehicle is automatically driven. If changing the required drive torque TR for the vehicle V based on this sum (A(0)+AX) of acceleration in this way, the vehicle speed at the time t=Δt is calculated as becoming v(1). However, the actual vehicle speed deviates from v(1). To eliminate this deviation, feedback control is performed.

That is, in the feedback control unit 43, the required drive torque TR for the vehicle V is controlled by feedback so that the difference (=v(0)−vz) of the current vehicle speed v(0) which is generated based on the driving plan 40 and the actual vehicle speed vz becomes zero, that is, the actual vehicle speed vz becomes the current vehicle speed v(0) which is generated based on the driving plan 40. Specifically, in the feedback control unit 41, the value (v(0)−vz)·G which is obtained by multiplying the difference (=v(0)−vz) of the current vehicle speed v(0) and the actual vehicle speed vz with a predetermined gain G is calculated, and the value of (v(0)−vz)·G which is obtained by the feedback control unit 41 is added to the acceleration A(0) which is obtained by the feed forward control unit 41.

In this way, the actual vehicle speed vz is controlled to the vehicle speed v(n) which is generated based on the driving plan 40. Note that, at the driving plan 40, the vehicle speeds v(0), v(1), v(2) . . . at the times t=0, t=Δt, t=2Δt . . . are generated. In the feed forward control unit 41, the accelerations A(0), A(1), A(2) . . . in the direction of advance of the vehicle V at the times t=0, t=Δt, t=2Δt . . . are calculated based on these vehicle speeds v(n), while in the calculation unit 44 of the required drive torque TR, the required drive torque TR for the vehicle V at the times t=0, t=Δt, t=2Δt . . . are calculated based on these accelerations A(0), A(1), A(2). That is, in the calculation unit 44 of the required drive torque TR, the predicted values of the future required drive torque TR at the times t=0, t=Δt, t=2Δt . . . are calculated.

Now then, in embodiments of the present invention, as explained above, when the automated driving of the vehicle is performed, a plurality of vehicle running paths are generated which show the changes along with time of the vehicle speed v and advancing direction θ of the host vehicle V. In this case, usually, a single vehicle running path which can reach the destination safely and in the shortest time while observing the law is selected from these plurality of vehicle running paths and the vehicle is automated driven along this selected vehicle running path. However, when the vehicle is driven by the automated driving mode along the selected vehicle running path in this way, this selected vehicle running path will differ from the vehicle running path corresponding to the driving characteristics of the driver in many cases. If the selected vehicle running path differs from the vehicle running path corresponding to the driving characteristics of the driver, the driver is given an odd feeling. In this case, the driver feels odd in this way not when the vehicle is driving over a straight road at a constant speed, but when for example in a driving scene such as when overtaking another vehicle driving in the front.

Therefore, in the automated driving system of a vehicle according to embodiments of the present invention, various driving scenes of the vehicle which may give an odd feeling to the driver are set in advance. When in the automated driving mode where the vehicle is driven without operations of the driver, the driving scene of the vehicle becomes a preset driving scene of the vehicle, generally speaking, a vehicle running path corresponding to the driving characteristics of the driver is selected as the vehicle running path. To this end, in the automated driving system of the vehicle according to the present invention, at the time of the manual driving mode where the vehicle is driven in accordance with operations of the driver, when the driving scene of the vehicle becomes a preset driving scene of the vehicle, the vehicle running path which is generated by the driving operations of the driver is learned. The vehicle running path which is generated by this driving operation of the driver is stored as a specific vehicle running path which represents the driving characteristics of the driver. At the time of the automated driving mode, when the driving scene of the vehicle becomes this preset driving scene of the vehicle, the vehicle is driven along a vehicle running path close to the stored specific vehicle running path which represents the driving characteristics of the driver.

Note that, as the preset driving scene of the vehicle, there are the case of another vehicle approaching which is running in front of the host vehicle and changing lanes to overtake the other vehicle, the case of another vehicle which is running in front of the host vehicle stopping and of following behind the other vehicle to stop, the case of approaching an obstacle present in front of the host vehicle and avoiding the obstacle, and various other driving scenes. Further, as explained above, in the HMI 7 which is shown in FIG. 1, when the driver performs an input operation to stop the automated driving, a signal is sent to the electronic control unit 10 to stop the automated driving and the automated driving mode is switched to the manual driving mode. Note that, if, at the time of the automated driving mode, the driver turns the steering wheel or depresses the accelerator pedal, at this time as well, the automated driving mode is switched to the manual driving mode.

Next, referring to FIG. 8A to FIG. 13B, the automated driving method of a vehicle according to the present invention will be explained. Note that, these FIG. 8A to FIG. 13B show one of the preset driving scenes of the vehicle of approaching another vehicle which is running in front of the host vehicle and changing lanes to overtake the other vehicle as a representative driving scene. In this embodiment according to embodiments of the present invention, this driving scene will be called the "driving scene 1". Note that, in these FIG. 8A to FIG. 13B, R1 and R2 indicate two mutually adjoining driving lanes, V shows the host vehicle which is driving on the driving lane R1, and A shows another vehicle which is running in front of the host vehicle V on the same driving lane R1 as the host vehicle V. Further, in FIG. 8A to FIG. 13B, DS and DE indicate distances from the other vehicle A. When the vehicle distance between the host vehicle V and the other vehicle A becomes smaller than the distance DS, it is judged that the driving scene is one of overtaking a vehicle.

Now then, in FIG. 8A to FIG. 10B, the solid line P which extends from the host vehicle V to the front shows the vehicle running path when the automated driving is not performed but the manual driving is continuously performed. That is, it shows the vehicle running path when the vehicle is being driven corresponding to the driving characteristics of the driver. Referring to FIG. 8A, in the example shown in FIG. 8A, as will be understood from the vehicle running path P, when the vehicle distance between the host vehicle V and the other vehicle A is larger than the distance DS, the host vehicle V changes lanes from the driving lane R1 to the driving lane R2. When in this way the vehicle distance between the host vehicle V and the other vehicle A is larger than the distance DS and the host vehicle V changes lanes, it is judged that this lane change is a simple lane change and not a lane change for overtaking the other vehicle A in the front. That is, it is judged that the running state of the host vehicle V at this time does not correspond to a driving scene of overtaking a vehicle. Therefore, at this time, the vehicle running path P is not learned.

On the other hand, in the example which is shown in FIG. 8B, as will be understood from the vehicle running path P, the host vehicle V changes lanes from the driving lane R1 to the driving lane R2 when the vehicle distance between the host vehicle V and the other vehicle A is smaller than distance DS. When the host vehicle V changes lanes when the vehicle distance between the host vehicle V and the other vehicle A is smaller than the distance DS in this way, it is judged that this lane change is a lane change for overtaking another vehicle A at the front. That is, it is judged that the running state of the host vehicle V at this time corresponds to a driving scene of overtaking a vehicle.

However, in the example which is shown in FIG. 8B, as will be understood from the vehicle running path P, the host vehicle V changes lanes from the driving lane R1 to the driving lane R2 when the vehicle distance between the host vehicle V and the other vehicle A is smaller than the distance DE. This distance DE is set from the possibility of contact of the host vehicle V and the other vehicle A. If the host vehicle V changes lanes when the vehicle distance between the host vehicle V and the other vehicle A becomes smaller than the distance DE, it is judged that there is a possibility of contact of the host vehicle V and the other vehicle A. A vehicle running path where there is the possibility of contact of the host vehicle V and the other vehicle A in this way is unsuitable for driving the vehicle in accordance with this vehicle running path at the time of the automated driving mode even if representing the driving characteristics of the driver. Therefore, at this time, the vehicle running path P is not learned. That is, if the host vehicle V changes lanes when the vehicle distance between the host vehicle V and the other vehicle A is between the distance DE and the distance DS, it is judged that the driving scene is a driving scene of overtaking a vehicle and the vehicle running path P is learned.

Figure 9:
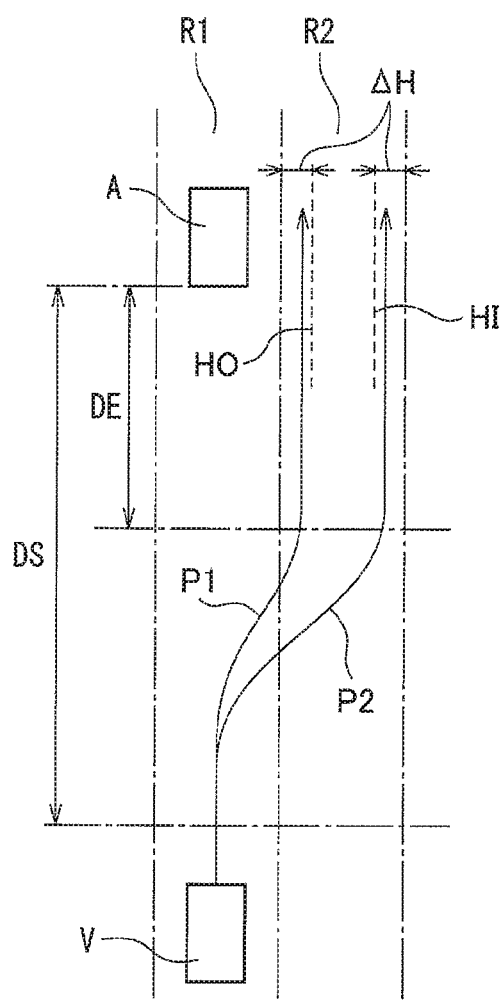
FIG. 9 is a view which shows an example of a driving pattern of a vehicle in the driving scene 1.

On the other hand, even if it is judged that the driving scene is a driving scene of overtaking a vehicle and even if the host vehicle V changes lanes when the vehicle distance between the host vehicle V and the other vehicle A is between the distance DE and the distance DS, sometimes the vehicle running path P is not learned. An example of such a case will be explained with reference to FIG. 9. FIG. 9 shows the case where the host vehicle V changes lanes from the driving lane R1 to the driving lane R2 when the vehicle distance between the host vehicle V and the other vehicle A is between the distance DE and the distance DS, but after the host vehicle V changes lanes to the driving lane R2, the host vehicle V runs in the driving lane R2 leaning greatly to the left side or leaning greatly to the right side. In such a case, there is the possibility of the host vehicle V contacting the other vehicle, so the vehicle running path P is not learned.

Specifically speaking, in FIG. 9, when the vehicle running path, as shown by P1, is positioned between the left end of the driving lane R2 and a limit line H0 which is separated from the left end of the driving lane R2 to the inside of the driving lane R2 by exactly a certain distance ΔH or when the vehicle running path, as shown by P2, is positioned between the right end of the driving lane R2 and a limit line H1 which is separated from the right end of the driving lane R2 to the inside of the driving lane R2 by exactly a certain distance ΔH, it is judged that there is a possibility of the host vehicle V and another vehicle contacting each other. Therefore, at this time, the vehicle running path P is not learned.

Figure 10A:
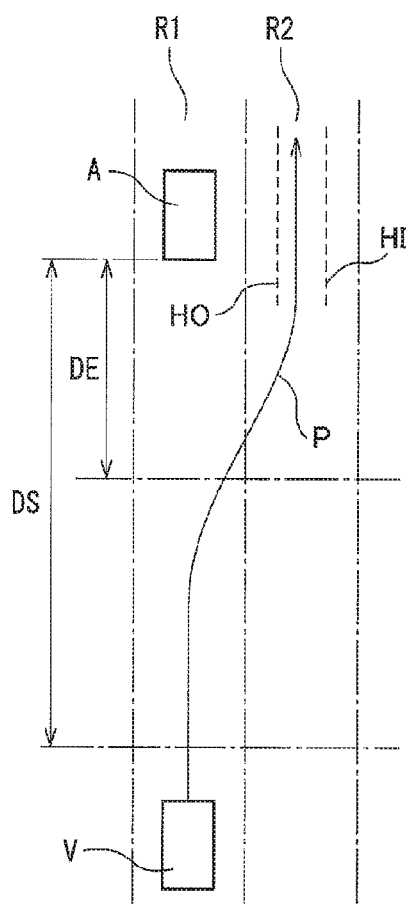
FIGS. 10A and 10B are views which show examples of driving patterns of a vehicle in the driving scene 1.

Therefore, it is judged that the driving scene is a driving scene of overtaking a vehicle and the vehicle running path P is learned in case where, as shown in FIG. 10A, the host vehicle V changes lanes when the vehicle distance between the host vehicle V and the other vehicle A is between the distance DE and the distance DS and, after the host vehicle V changes lanes to the driving lane R2, the host vehicle V is positioned in the driving lane R2 between the limit line HO and the limit line HI. That is, it is judged that the driving scene is a driving scene of overtaking a vehicle and the vehicle running path P is permitted to be learned when the vehicle distance between the host vehicle V and the other vehicle A at the time of the start of change of lanes of the host vehicle V is between the distance DE and the distance DS and the position of the host vehicle V in the driving lane R2 after the host vehicle V changes lanes to the driving lane R2 is between the limit line HO and the limit line HI.

Therefore, in embodiments of the present invention, for the vehicle distance between the host vehicle V and the other vehicle A at the time of the start of change of lanes of the host vehicle V, the distance between the distance DE and the distance DS is called the learning permission range, while for the position of the host vehicle V in the driving lane R2 after the host vehicle V changes lanes to the driving lane R2, the distance between the limit line HO and the limit line HI is called the learning permission range. Therefore, in embodiments of the present invention, when the vehicle distance between the host vehicle V and the other vehicle A at the time of the start of change of lanes of the vehicle V is within the learning permission range and the position of the host vehicle V in the driving lane R2 after the host vehicle V changes lanes to the driving lane R2 is in the learning permission range, it is judged that the driving scene is a driving scene of overtaking a vehicle and the vehicle running path P is learned.

Figure 10B:
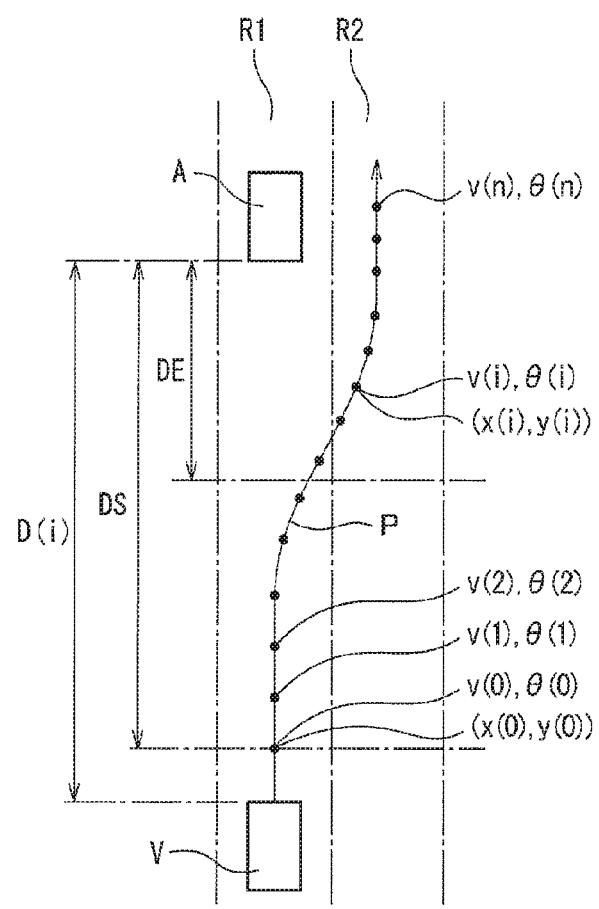

FIG. 10A shows when the vehicle distance between the host vehicle V and the other vehicle A at the time of the start of change of lanes of the host vehicle V is between the distance DE and the distance DS, that is, is within the learning permission range, and the position of the host vehicle V in the driving lane R2 after the host vehicle V changes lanes to the driving lane R2 is between the limit line HO and the limit line HI, that is, is within the learning permission range. Therefore, at this time, it is judged that the driving scene is a driving scene of overtaking a vehicle, and the vehicle running path P is learned. FIG. 10B shows one example of the learning method of the vehicle running path P at this time.

In the embodiment according to the present invention, at the time of manual driving, the vehicle distance D(i) between the host vehicle V and the other vehicle A, the position (x(i), y(i)) of the host vehicle V, and the running state (v(i), θ(i)) of the host vehicle V continue to be stored for each Δt time. On the other hand, at the time of manual driving, the driving scene of the vehicle is continuously monitored by the driving scene judgment unit 17, based on the information of the surroundings of the vehicle which is detected by the external sensor 1. In this case, for example, when it is judged by the driving scene judgment unit 17 that the host vehicle V approaches another vehicle A which is running in front of the host vehicle V and changes lanes to overtake the other vehicle A and further at this time it is judged that the vehicle distance D(i) between the host vehicle V and the other vehicle A is shorter than the distance DS which is shown from FIG. 8A to FIG. 10B at the time of start of the lane change action, it is judged by the driving scene judgment unit 17 that the driving scene is a driving scene of overtaking a vehicle. Note that, in this case, for example, when the front end of the host vehicle V is positioned in the front from the front end of the other vehicle A, it is judged that the other vehicle A has been overtaken.

When it is judged by the driving scene judgment unit 17 that the driving scene is a driving scene of overtaking a vehicle, for example, as shown in FIG. 10B, the time when the vehicle distance D(i) between the host vehicle V and the other vehicle A becomes the distance DS is made the time t=0. The position (x(i), y(i)) of the host vehicle V which is stored at the time t=0 is re-stored as the position (x(0), y(0)) of the host vehicle V, while the running state (v(i), θ(i)) of the host vehicle V which is stored at the time t=0 is re-stored as the running state (v(0), θ(0)). In this case, for the position of the host vehicle V, on the road map which is stored in the storage device 5, the advancing direction of the vehicle at the time t=0 is made the y-coordinate, while the direction perpendicular to the advancing direction of the vehicle on the road map which is stored in the storage device 5 is made the x-coordinate.

Similarly, the position of the vehicle V and the running state of the vehicle V after Δt time from the time t=0 (t=Δt) are re-stored respectively as (x(1), y(1)) and (v(1), θ(1)), while the position of the vehicle V and the running state of the vehicle V after further the Δt time from the time t=0, that is, after 2Δt time from the time t=0 (t=2Δt), are re-stored respectively as (x(2), y(2)) and (v(2), θ(2)). Similarly, until reaching the time (t=nΔt) where it is judged that the vehicle has been overtaken, the position of the vehicle V and the running state of the vehicle V after the iΔt time from the time t=0 (t=iΔt) are successively re-stored as (x(i), y(i)) and (v(i), θ(i)).

If it is judged that the time (t=nΔt) where the vehicle is overtaken is reached, the stored vehicle distance D(i) between the host vehicle V and the other vehicle A and the re-stored position (x(i), y(i)) of the vehicle V are used to judge if the vehicle distance D(i) between the host vehicle V and the other vehicle A at the time of the start of change of lanes of the vehicle V is between the distance DE and the distance DS, that is, is within the learning permission range, and if the position of the host vehicle V in the driving lane R2 after the host vehicle V changes lanes to the driving lane R2 is between the limit line HO and the limit line HI, that is, is within the learning permission range. When it is judged that the vehicle distance D(i) between the host vehicle V and the other vehicle A at the time of the start of change of lanes of the host vehicle V is not within the learning permission range or the position of the host vehicle V in the driving lane R2 after the host vehicle V changes lanes to the driving lane R2 is not within the learning permission range, the stored vehicle distance D(i), position (x(i), y(i)) of the vehicle V, and running state (v(i), θ(i)) of the vehicle V are erased. At this time, the vehicle running path P is not learned. That is, at this time, the vehicle running path P is not adopted as the specific vehicle running path which represents the driving characteristics of the driver when the driving scene is a driving scene of overtaking a vehicle.

As opposed to this, when it is judged that the vehicle distance D(i) between the host vehicle V and the other vehicle A at the time of the start of change of lanes of the vehicle V is within the learning permission range and the position of the host vehicle V in the driving lane R2 after the host vehicle V changes lanes to the driving lane R2 is within the learning permission range, the vehicle running path P at this time is stored as the specific vehicle running path P which represents the driving characteristics of the driver at the time of a driving scene of overtaking a vehicle. That is, at this time, the vehicle running path P is learned, and the vehicle running path P is adopted as the specific vehicle running path which represents the driving characteristics of the driver when the driving scene is a driving scene of overtaking a vehicle. Note that, at this time, the vehicle running path P is stored in the form of data which shows the position (x(i), y(i)) of the vehicle V and the running state (v(i), θ(i)) of the vehicle V at the different times t=iΔt.

Now then, up to here, the case where the vehicle running path corresponding to the driving characteristics of the driver is learned based on the vehicle running path P when the automated driving is not performed but the manual driving is continuously performed was explained. However, as explained above, if the driver turns the steering wheel or depresses the accelerator pedal at the time of the automated driving mode, the automated driving mode is switched to the manual driving mode and, at this time as well, the vehicle running path P becomes one corresponding to the driving characteristics of the driver. Next, the vehicle running path P when switching from the automated driving mode to the manual driving mode will be explained with reference to FIG. 11A and FIG. 11B.

Figure 11A:
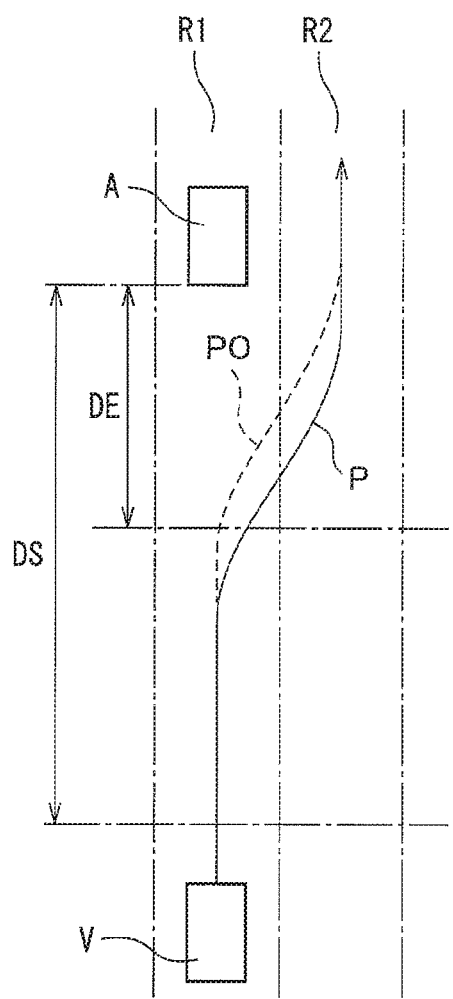
FIGS. 11A and 11B are views which show examples of driving patterns of a vehicle in the driving scene 1.
Figure 11B:
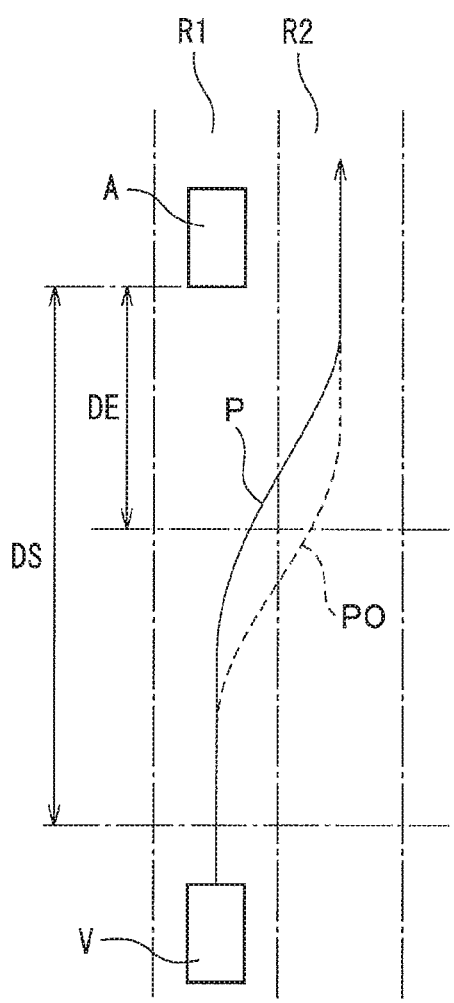

In FIG. 11A and FIG. 11B, PO shows the vehicle running path when, at the time of the automated driving mode, the automated driving of the vehicle is performed by the automated driving system. Therefore, when the driving mode is set to the automated driving mode, the vehicle is automatically driven along this vehicle running path PO. However, in this case, sometimes this vehicle running path PO differs from the driving characteristics of the driver. In this case, sometimes the driver turns the steering wheel or depresses the accelerator pedal so that the vehicle running path becomes one corresponding to the driving characteristics of the driver. In FIG. 11A and FIG. 11B, P shows the case where, at the time of the automated driving mode, the driver turns the steering wheel or depresses the accelerator pedal so that the vehicle running path becomes one corresponding to the driving characteristics of the driver and thereby the automated driving mode is switched to the manual driving mode.

FIG. 11A shows the case where, judging from the driving characteristics of the driver, the timing of start of lane change of the host vehicle V would be too slow if using the vehicle running path PO by the automated driving system. At this time, as shown in the vehicle running path P, sometimes the steering wheel is turned or the accelerator pedal is depressed to switch from the automated driving mode to the manual driving mode at an earlier timing compared with the time of the start of change of lanes of the host vehicle V by the automated driving. In this case, the vehicle running path P becomes the vehicle running path corresponding to the driving characteristics of the driver. On the other hand, FIG. 11B shows the case where, judging from the driving characteristics of the driver, the timing of start of lane change of the host vehicle V would be too early if using the vehicle running path PO by the automated driving system. At this time, as shown by the vehicle running path P, sometimes the steering wheel is turned or the accelerator pedal is depressed to switch from the automated driving mode to the manual driving mode at a later timing compared with the time of the start of change of lanes of the host vehicle V by the automated driving. In this case, the vehicle running path P becomes the vehicle running path corresponding to the driving characteristics of the driver.

Therefore, in the embodiment according to the present invention, in the case where, at the time of the automated driving mode, the driver turns the steering wheel or depresses the accelerator pedal so that the vehicle running path becomes one corresponding to the driving characteristics of the driver and thereby the automated driving mode is switched to the manual driving mode and where the vehicle distance between the host vehicle V and the other vehicle A at the time of the start of change of lanes of the host vehicle V is within the learning permission range and the position of the host vehicle V in the driving lane R2 after the host vehicle V changes lanes to the driving lane R2 is within the learning permission range, the vehicle running path P is stored as the specific vehicle running path which represents the driving characteristics of the driver as shown in FIG. 10B.

FIG. 12A and FIG. 12B show the case of learning the vehicle running path P with the highest frequency among the plurality of vehicle running paths P along which the host vehicle V was driven when, for example, the driving scenes are ones of overtaking a vehicle at the time of the manual driving mode, the speeds of the host vehicle V are the same, the speeds of the other vehicle A are the same, and the weather and state of the road surface are the same. In this case, among the plurality of vehicle running paths P along which the host vehicle V was driven when the speeds of the host vehicle V are the same, the speeds of the other vehicle A are the same, and the weather and state of the road surface are the same, only the vehicle running path P where the vehicle distance between the host vehicle V and the other vehicle A at the time of the start of change of lanes of the host vehicle V is between the distance DE and the distance DS, that is, is within the learning permission range, and the position of the host vehicle V in the driving lane R2 after the host vehicle V changes lanes to the driving lane R2 is between the limit line HO and the limit line HI, that is, is within the learning permission range as shown in FIG. 12A, is selected. Only the selected vehicle running paths P are stored as shown in FIG. 12B.

Next, the vehicle running path P with the highest frequency of occurrence is found from the stored plurality of vehicle running paths P. For example, when assuming that the vehicle running paths P which are shown in FIG. 12B include the five vehicle running paths P1 to P5, first, the sum of the squares of the differences of the values x(i) of the x-coordinates at different times between the vehicle running path P1 and the vehicle running path P2 and the squares of the differences of the values y(i) of the y-coordinates at the different times between the vehicle running path P1 and the vehicle running path P2 is calculated. In this case, the smaller this sum, the closer the two vehicle running paths P. Next, the above-mentioned sum is calculated for the vehicle running path P1 and the vehicle running path P3, next, the above-mentioned sum is calculated for the vehicle running path P1 and the vehicle running path P4, next, the above-mentioned sum is calculated for vehicle running path P1 and the vehicle running path P5 and finally the total of all of the above-mentioned sums is calculated.

Next, with respect to the vehicle running path P2, the above-mentioned sum for the vehicle running path P2 and the vehicle running path P1, the above-mentioned sum for the vehicle running path P2 and the vehicle running path P3, the above-mentioned sum for the vehicle running path P2 and the vehicle running path P4, and the above-mentioned sum for the vehicle running path P2 and the vehicle running path P5 are calculated, and then the total of all of the sums is calculated for the vehicle running path P2. In the same way, the total of all of the sums is calculated for the vehicle running path P3, the total of all of the sums is calculated for the vehicle running path P4, and the total of all of the sums is calculated for the vehicle running path P5. In this case, the smaller the totals of all of the sums, vehicle running paths P with a higher frequency of occurrence are shown. Therefore, the vehicle running path P with the smallest total of the sums among all of the totals of the sums which are calculated for these vehicle running paths P1, P2, P3, P4, and P5 is stored as the specific vehicle running path which represents the driving characteristics of the driver.

FIG. 13A and FIG. 13B show the method of determination of the vehicle running path when it is judged that the driving scene is a driving scene of overtaking a vehicle at the time of the automated driving mode. Now then, as explained above, in embodiments of the present invention, a plurality of vehicle running paths which show changes along with time in the speed v and advancing direction θ of the vehicle V are generated based on the information of the surroundings of the vehicle which is detected by the external sensor 1 and the map information. The plurality of vehicle running paths which are generated when it is judged that the driving scene is a driving scene of overtaking a vehicle at the time of the automated driving mode are shown in FIG. 13A by PO1, PO2, PO3, and PO4.

In this case, in the past, as explained above, at the time of the automated driving mode, regardless of the driving characteristics of the driver, a single vehicle running path which can reach the destination safely and in the shortest time while observing the law is selected from these plurality of vehicle running paths PO1, PO2, PO3, and PO4, and the vehicle is automatically driven along this selected vehicle running path POX. In other words, in the past, at the time of the automated driving mode, regardless of the driving characteristics of the driver, a single vehicle running path POX is determined from the plurality of vehicle running paths PO1, PO2, PO3, and PO4 by the driving plan generation unit 14, and the vehicle is automatically driven along this determined vehicle running path POX. However, if the vehicle is automatically driven along the vehicle running path POX selected in this way, in many cases this selected vehicle running path POX will differ from the vehicle running path corresponding to the driving characteristics of the driver. The selected vehicle running path POX will give an odd feeling to the driver if the selected vehicle running path POX differs from the vehicle running path corresponding to the driving characteristics of the driver.

Therefore, in embodiments of the present invention, at the time of the automated driving mode, compared with the single vehicle running path POX which is determined by the driving plan generation unit 14 regardless of the driving characteristics of the driver, a vehicle running path close to the specific vehicle running path which represents the driving characteristics of the driver is selected from among the plurality of vehicle running paths PO1, PO2, PO3, and PO4, and the vehicle V is automatically driven along this selected vehicle running path. That is, assuming that, in FIG. 13B, POX indicates a single vehicle running path which is determined by the driving plan generation unit 14 regardless of the driving characteristics of the driver, and, in FIG. 13B, P indicates a specific learned running path which represents the driving characteristics of the driver which are shown in FIG. 10B or indicates a specific vehicle running path with the highest frequency of occurrence which was explained with reference to FIG. 12B, in embodiments of the present invention, at the time of the automated driving mode, compared with the single vehicle running path POX which is determined by the driving plan generation unit 14 regardless of the driving characteristics of the driver, a vehicle running path close to the specific vehicle running path P which represents the driving characteristics of the driver is selected from among the plurality of vehicle running paths PO1, PO2, PO3, and PO4 which are shown in FIG. 13A and the vehicle V is automatically driven along this selected vehicle running path.

Note that, in FIG. 13A, the vehicle running paths PO1, PO2, PO3, and PO4 show the vehicle running paths which are generated when the vehicle distance between the host vehicle V and the other vehicle A becomes the distance DS, that is, which are generated at the time t=0 in FIG. 10B. In this way, in embodiments of the present invention, at the time of the automated driving mode, compared with the single vehicle running path POX which is determined by the driving plan generation unit 14 regardless of the driving characteristics of the driver, a vehicle running path close to the specific vehicle running path P which represents the driving characteristics of the driver is selected from among the plurality of vehicle running path PO1, PO2, PO3, and PO4. Next, as one example, the case where at the time of the automated driving mode, the vehicle running path closest to the specific vehicle running path P which represents the driving characteristics of the driver is selected from the plurality of vehicle running paths PO1, PO2, PO3, and PO4 will be explained.

As explained above, if calculating the sum of the squares of the differences of the values x(i) of the x-coordinates at the different times between the specific vehicle running path P shown in FIG. 13A and any of the vehicle running paths PO shown in FIG. 13B and the squares of differences of the values y(i) of the y-coordinates at the different times between the specific vehicle running path P shown in FIG. 13A and any of the vehicle running paths PO shown in FIG. 13B, the smaller this sum, the closer the two vehicle running paths P, PO. Therefore, in this case as well, the above-mentioned sum is calculated for the specific vehicle running path P shown in FIG. 13B and the vehicle running path PO1 shown in FIG. 13A, next, the above-mentioned sum is calculated for the specific vehicle running path P shown in FIG. 13B and the vehicle running path PO2 shown in FIG. 13A, next, the above-mentioned sum is calculated for the specific vehicle running path P shown in FIG. 13B and the vehicle running path PO3 shown in FIG. 13A, next, the above-mentioned sum is calculated for the specific vehicle running path P shown in FIG. 13B and the vehicle running path PO4 shown in FIG. 13A, and the vehicle running path PO3 which becomes the smallest in the sums of the specific vehicle running path P and the vehicle running paths PO1, PO2, PO3, and PO4 is selected as the specific running path which represents the driving characteristics of the driver.

In this way, the vehicle running path PO3 closest to the specific learned running path P expressing the driving characteristics of the driver is selected as the learned running path and the vehicle is automatically driven along this selected learned running path. Therefore, even if the vehicle V is automatically driven, the vehicle is driven corresponding to the driving characteristics of the driver. As a result, the driver is no longer given an odd feeling.

Figure 14A:
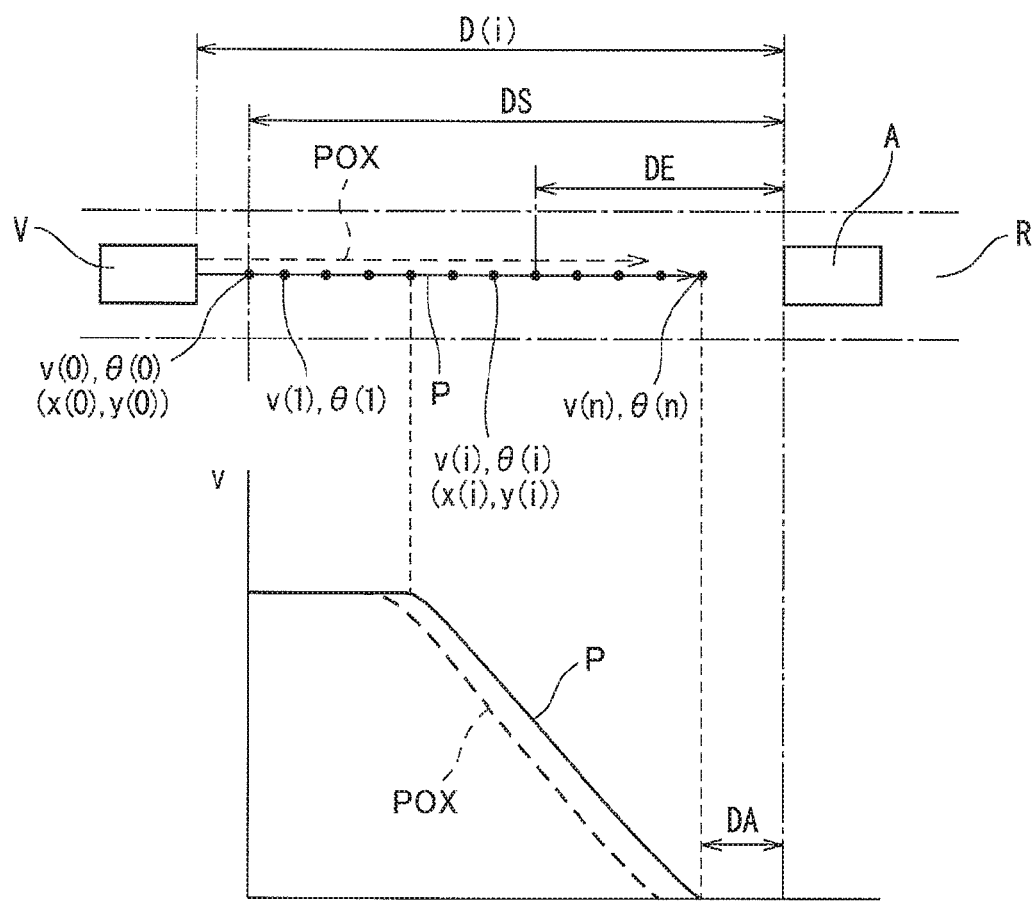
FIGS. 14A and 14B are views which show examples of driving patterns of a vehicle in the driving scene 2.
Figure 14B:
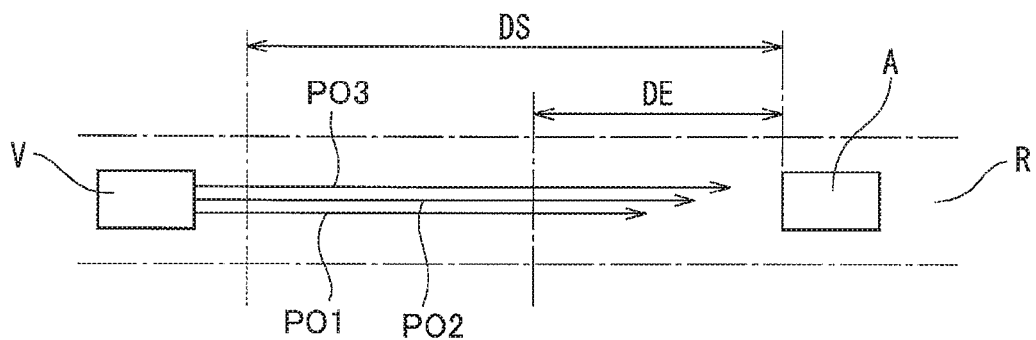

Next, referring to FIG. 14A and FIG. 14B, the method of automated driving of the vehicle in another driving scene of the vehicle will be explained. FIG. 14A and FIG. 14B show a typical driving scene of one of the preset driving scenes of the vehicle where another vehicle which is running in front of the host vehicle V stops and the host vehicle V follows behind the other vehicle and stops. In the embodiment according to the present invention, this driving scene will be referred to as the "driving scene 2". Note that, in these FIG. 14A and FIG. 14B, R shows a driving lane, V shows the host vehicle which is driving on the driving lane R, and A shows another vehicle which is running in front of the host vehicle V on the same driving lane R as the host vehicle V. Further, in FIG. 14A and FIG. 14B, D(i), DS, DE, and DA show the distances from the other vehicle A to the host vehicle V. When the vehicle distance D(i) between the host vehicle V and the other vehicle A becomes smaller than the distance DS, it is judged that the driving scene is one for stopping the vehicle. Further, DA shows the vehicle distance between the host vehicle V and the other vehicle A when the host vehicle V is stopped.

Now then, in FIG. 14A, the solid line P which extends from the host vehicle V forward shows the vehicle running path when the automated driving is not performed but when the manual driving is continuously performed or when the driver operates the brake pedal and the automated driving mode is switched to the manual driving mode. That is, the solid line P shows the vehicle running path when the vehicle is made to be driven corresponding to the driving characteristics of the driver. In FIG. 14A, the change in the speed v of the vehicle when, at the time of the manual driving mode, the driving scene becomes a driving scene for stopping the vehicle is shown by the solid line P.

Now then, in FIG. 14A, if the stopping action of the host vehicle V is performed when the vehicle distance D(i) between the host vehicle V and the other vehicle A is larger than the distance DS, it is judged that this stopping action is a simple stopping action and not a driving scene where the other vehicle A which is running in front of the host vehicle V is stopped and where the host vehicle V follows behind the other vehicle A and stops. That is, it is judged that the stopping action of the host vehicle V at this time does not correspond to a driving scene where the other vehicle A which is running in front of the host vehicle V is stopped and where the host vehicle V follows behind the other vehicle A and stops. Therefore, at this time, the vehicle running path P is not learned. As opposed to this, if the stopping action of the vehicle V is performed when the vehicle distance D(i) between the host vehicle V and the other vehicle A is smaller than the distance DS, it is judged that the driving scene is a driving scene where the other vehicle A which is running in front of the host vehicle V is stopped and where the host vehicle V follows behind the other vehicle A and stops.

On the other hand, even if the stopping action of the host vehicle V is performed when the vehicle distance D(i) between the host vehicle V and the other vehicle A is smaller than the distance DE, it is judged that the driving scene is one where the other vehicle A which is running in front of the host vehicle V is stopped and where the host vehicle V follows behind the other vehicle A and stops. However, this distance DE is determined from the possibility of contact between the host vehicle V and the other vehicle A when the stopping action of the host vehicle V is performed. If the vehicle distance D(i) between the host vehicle V and the other vehicle A becomes smaller than the distance DE, if the host vehicle V stopping action is performed, it is judged that there is the possibility of contact between the host vehicle V and the other vehicle A. Therefore, at this time, the vehicle running path P is not learned. That is, in case where the stopping action of the host vehicle V is performed when the vehicle distance between the host vehicle V and the other vehicle A is between the distance DE and the distance DS, it is judged that the driving scene is the driving scene for the host vehicle V to follow behind the other vehicle A and stop and the vehicle running path P is learned.

Therefore, also in the case which is shown in FIG. 14A, for the vehicle distance D(i) between the host vehicle V and the other vehicle A at the time of start of the stopping action of the host vehicle V, the distance between the distance DE and the distance DS is called the "learning permission range". Therefore, in embodiments of the present invention, when the vehicle distance D(i) between the host vehicle V and the other vehicle A at the time of start of the stopping action of the host vehicle V is within the learning permission range, it is judged that the driving scene is a driving scene for the host vehicle V to follow behind the other vehicle A and stop and the vehicle running path P is learned. FIG. 14A shows the case where the vehicle distance between the host vehicle V and the other vehicle A at the time of starting the stopping action of the host vehicle V is between the distance DE and the distance DS, that is, is within the learning permission range. Therefore, at this time, it is judged that the driving scene is a driving scene for the host vehicle V to follow behind the other vehicle A and stop, and the vehicle running path P is learned. In FIG. 14A, one example of the learning method of the vehicle running path P which is performed at this time is shown.

In the case which is shown in FIG. 14A as well, when the manual driving is performed, the vehicle distance D(i) between the host vehicle V and the other vehicle A, the position (x(i), y(i)) of the host vehicle V, and the running state (v(i), θ(i)) of the host vehicle V for each Δt time continue to be stored. On the other hand, at the time of manual driving, the driving scene of the vehicle is constantly monitored by the driving scene judgment unit 17 based on the information of the surroundings of the vehicle which is detected by the external sensor 1. In this case, for example, when it is judged by the driving scene judgment unit 17 that the host vehicle V follows behind the other vehicle A and stops and at this time the vehicle distance D(i) between the host vehicle V and the other vehicle A at the time of start of the stopping action of the host vehicle V is shorter than the distance DS shown in FIG. 14A, it is judged by the driving scene judgment unit 17 that the driving scene is a driving scene where the host vehicle V follows behind the other vehicle A and stops.

When it is judged by the driving scene judgment unit 17 that the driving scene is a driving scene for the host vehicle V to follow behind the other vehicle A and stop, for example, when the vehicle distance D(i) between the host vehicle V and the other vehicle A becomes the distance DS, the time "t" is made 0 as shown in FIG. 14A, the position (x(i), y(i)) of the vehicle V which is stored at the time t=0 is re-stored as the position (x(0), y(0)) of the vehicle V, and the running state (v(i), θ(i)) of the vehicle V which is stored at the time t=0 is re-stored as the running state (v(0), θ(0)). In this case, regarding the position of the vehicle V, the advancing direction of the vehicle at the time t=0 on the road map which is stored in the storage device 5 is made the y-coordinate, while the direction perpendicular to the advancing direction of the vehicle on the road map which is stored in the storage device 5 is made the x-coordinate.

Similarly, the position of the vehicle V and the running state of the vehicle V after the Δt time from the time t=0 (t=Δt) are respectively re-stored as (x(1), y(1)) and (v(1), θ(1)), while the position of the vehicle V and the running state of the vehicle V after a further Δt time from the time t=0 (t=Δt), that is, after the 2Δt time from the time t=0

(t=2Δt), are respectively re-stored as (x(2), y(2)) and (v(2), θ(2)). Similarly, until the vehicle distance D(i) between the host vehicle V and the other vehicle A becomes the distance DA which is shown in FIG. 14A, that is, until reaching the time (t=nΔt) where it is judged that the vehicle is stopped, the position of the vehicle V and the running state of the vehicle V after the iΔt time from the times t=0 (t=iΔt) are successively re-stored as (x(i), y(i)) and (v(i), θ(i)).

When reaching the time (t=nΔt) where it is judged that the host vehicle V is stopped, the stored vehicle distance D(i) between the host vehicle V and the other vehicle A and the re-stored position (x(i), y(i)) of the vehicle V are used to judge if the vehicle distance D(i) between the host vehicle V and the other vehicle A at the time of starting the stopping action of the host vehicle V is between the distance DE and the distance DS, that is, is within the learning permission range. When it is judged that the vehicle distance D(i) between the host vehicle V and the other vehicle A at the time of start of the starting action of the host vehicle V is not within the learning permission range, the stored vehicle distance D(i), the position (x(i), y(i)) of the vehicle V, and the running state (v(i), θ(i)) of the vehicle V are erased. At this time, the vehicle running path P is not learned. That is, at this time, the vehicle running path P is not adopted as the specific vehicle running path which represents the driving characteristics of the driver at the time of a driving scene where the vehicle V follows behind another vehicle A and stops.

As opposed to this, when it is judged that the vehicle distance D(i) between the host vehicle V and the other vehicle A at the start of the stopping action of the host vehicle V is within the learning permission range, the vehicle running path at this time is stored as the specific vehicle running path P which represents the driving characteristics of the driver at the time of the driving scene for the host vehicle V to follow behind the other vehicle A and stop. That is, at this time, the vehicle running path is learned and the vehicle running path P is adopted as a specific vehicle running path which represents the driving characteristics of the driver at the time of the driving scene for the host vehicle V to follow behind the other vehicle A and stop. Note that, at this time, this specific vehicle running path P is stored in the form of data which shows the position (x(i), y(i)) of the vehicle V and the running state (v(i), θ(i)) of the vehicle V at the different times t=iΔt.

FIG. 14B shows the method of determination of the vehicle running path when it is judged at the time of the automated driving mode that the driving scene is a driving scene for the host vehicle V to follow behind the other vehicle A and stop. That is, as explained above, in embodiments of the present invention, a plurality of vehicle running paths which show the changes along with time of the speed v and advancing direction θ of the host vehicle V are generated based on the information on the surroundings of the vehicle which is detected by the external sensor 1 and the map information. The plurality of vehicle running paths which are generated at the time of the automated driving mode when it is judged that the driving scene is one for the host vehicle V to follow behind another vehicle A and stop are shown in FIG. 14B by PO1, PO2, and PO3.

In this case, in the past, as explained above, at the time of the automated driving mode, regardless of the driving characteristics of the driver, a single vehicle running path POX which can reach the destination safely and in the shortest time while observing the law is selected from the plurality of vehicle running paths PO1, PO2, and PO3, and the vehicle is automatically driven along this selected vehicle running path POX. In other words, in the past, at the time of the automated driving mode, regardless of the driving characteristics of the driver, a single vehicle running path POX is determined from the plurality of vehicle running paths PO1, PO2, and PO3 by the driving plan generation unit 14 and the vehicle is automatically driven along this determined vehicle running path POX. The vehicle running path POX and vehicle speed v at this time are shown in FIG. 14A by the broken lines. However, when the vehicle is automatically driven along the vehicle running path POX which is selected in this way, this selected vehicle running path POX will often differ from the vehicle running path corresponding to the driving characteristics of the driver. If the selected vehicle running path POX differs from the vehicle running path corresponding to the driving characteristics of the driver, the driver is given an odd feeling.

Therefore, in embodiments of the present invention, at the time of the automated driving mode, compared with a single vehicle running path POX which is determined by the driving plan generation unit 14 regardless of the driving characteristics of the driver, the vehicle running path close to the specific vehicle running path P which represents the driving characteristics of the driver is selected from the plurality of vehicle running paths PO1, PO2, and PO3 and the vehicle V is automatically driven along the selected vehicle running path. That is, in FIG. 14A, if assuming "P" indicates a specific vehicle running path expressing operating characteristics of the driver, in embodiments of the present invention, in FIG. 14A, at the time of the automated driving mode, compared with a single vehicle running path POX which is determined by the driving plan generation unit 14 regardless of the driving characteristics of the driver, a vehicle running path close to the specific vehicle running path P which represents the driving characteristics of the driver is selected from the plurality of vehicle running paths PO1, PO2, and PO3 which are shown in FIG. 14B and the vehicle V is automatically driven along this selected vehicle running path.

Note that, in FIG. 14B, the vehicle running paths PO1, PO2, and PO3 show vehicle running paths which are generated when the vehicle distance between the host vehicle V and the other vehicle A becomes the distance DS, that is, are generated at the time t=0 in FIG. 14A. Next, as one example, the case where at the time of the automated driving mode, the vehicle running path closest to the specific vehicle running path P which represents the driving characteristics of the driver is selected from the plurality of vehicle running paths PO1, PO2, and PO3 will be explained.

As explained above, if calculating the sum of the squares of the differences of the values x(i) of the x-coordinates at the different times between the specific vehicle running path P shown in FIG. 14A and any of the vehicle running paths PO shown in FIG. 14B and the squares of differences of the values y(i) of the y-coordinates at the different times between the specific vehicle running path P shown in FIG. 14A and any of the vehicle running paths PO shown in FIG. 14B, the smaller this sum, the closer the two vehicle running paths P and PO. Therefore, in this case as well, the above-mentioned sum is calculated for the specific vehicle running path P shown in FIG. 14A and the vehicle running path PO1 shown in FIG. 14B, next, the above-mentioned sum is calculated for the specific vehicle running path P shown in FIG. 14A and the vehicle running path PO2 shown in FIG. 14B, next the above-mentioned sum is calculated for the specific vehicle running path P shown in FIG. 14A and the vehicle running path PO3 shown in FIG. 14B, and the vehicle running path PO2 which becomes the smallest among the sums for the vehicle running path P and the vehicle running paths PO1, PO2, and PO3 is selected as the specific learned running path which represents the driving characteristics of the driver.

In this way, the vehicle running path PO2 closest to the specific vehicle running path P which represents the driving characteristics of the driver is selected as the specific vehicle running path and the vehicle is automatically driven along this selected vehicle running path. Therefore, even if the vehicle V is automatically driven, the vehicle is driven corresponding to the driving characteristics of the driver and, as a result, the driver is no longer given an odd feeling.

Figure 15A:
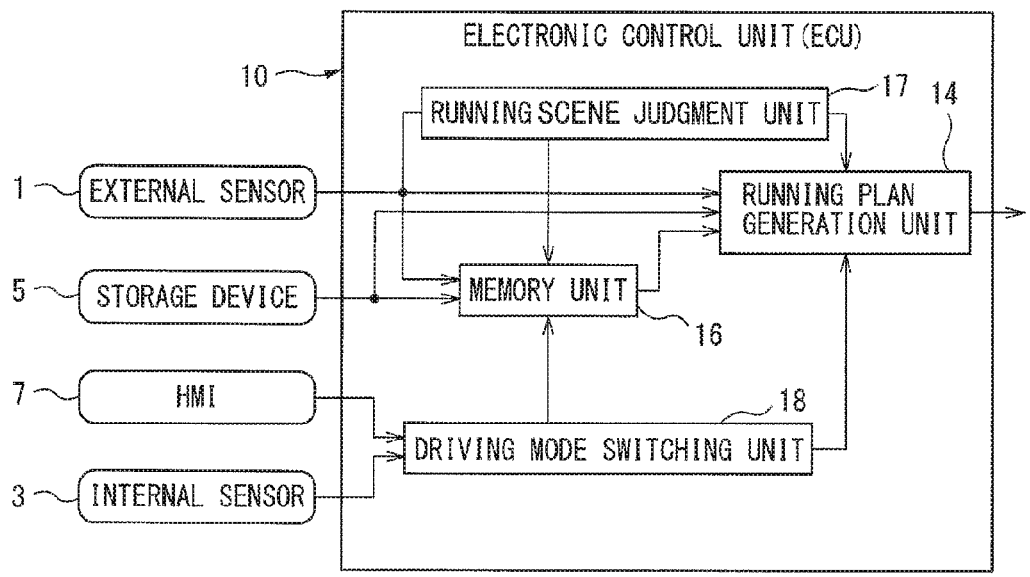
FIGS. 15A and 15B are block diagrams for explaining the function of the configuration of the automated driving system according to the present invention.

In this way, in embodiments of the present invention, as shown in the block diagram for explaining the functions of the configuration of the automated driving system of FIG. 15A, there are provided an external sensor 1 which detects information of surroundings of a host vehicle V, a storage device 5 which stores map information, and an electronic control unit 10. The electronic control unit 10 comprises a driving plan generation unit 14 which generates a plurality of vehicle running paths which show changes along with time of a speed and advancing direction of the host vehicle V based on the map information stored in the storage device 5 and the information of surroundings of the host vehicle V which is detected by the external sensor 1 and decides on a single vehicle running path from among these plurality of vehicle running paths, a driving scene judgment unit 17 which judges a driving scene of the host vehicle V based on the information of the surroundings of the host vehicle V which is detected by the external sensor 1, a driving mode switching unit 18 which switches a driving mode of the host vehicle V between a manual driving mode where the vehicle is driven by operations of the driver and an automated driving mode where the vehicle is driven without operations of the driver, and a storage unit 16 which stores a running path of the host vehicle V in a preset driving scene at the time of the manual driving mode as a specific vehicle running path which represents the driving characteristics of the driver in the preset driving scene. At the time of the automated driving mode, the driving plan generation unit 14 selects a vehicle running path from the plurality of vehicle running paths when the driving scene becomes a driving scene for which the specific vehicle running path is stored in such a way that the selected vehicle running path is closer to the specific vehicle running path compared with the single vehicle running path which is determined by the driving plan generation unit 14 regardless of the driving characteristics of the driver, that is, compared with the single vehicle running path which is determined by the driving plan generation unit 14 when no specific vehicle running path is stored, and the driving plan generation unit 14 makes the vehicle be automated driven along with the selected vehicle running path.

Note that, in the embodiment according to the present invention, the above-mentioned preset driving scene is a driving scene where the host vehicle V approaches another vehicle A running in front of the host vehicle V and changes lanes and overtakes the other vehicle A. Further, in the embodiment according to the present invention, the above-mentioned preset driving scene is a driving scene where another vehicle A running in front of the host vehicle V stops and the host vehicle V follows behind the other vehicle A and stops.

Figure 15B:
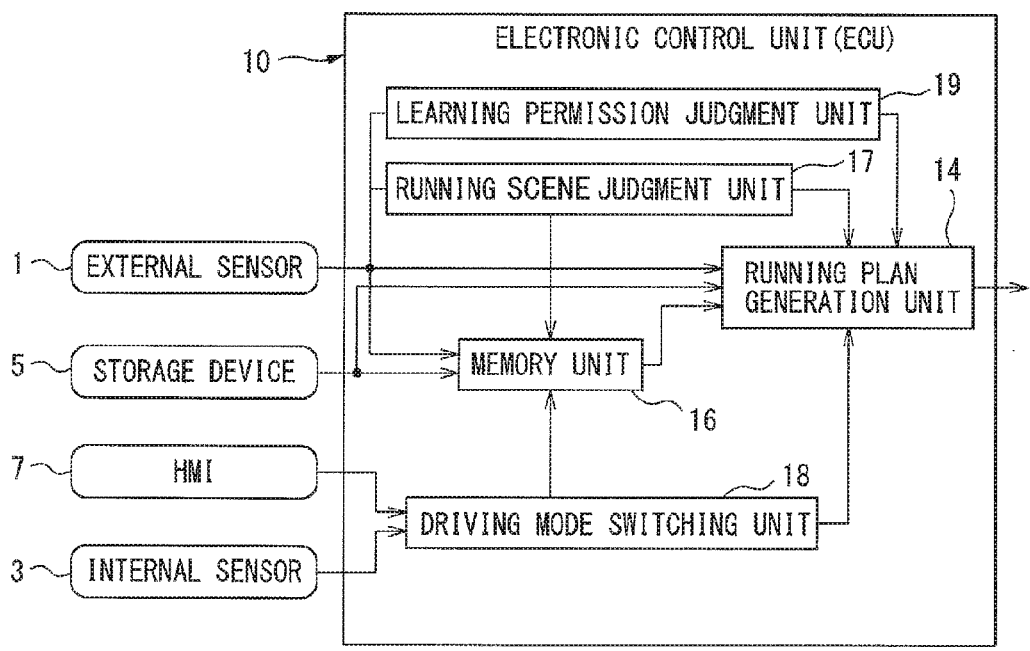

Furthermore, in the embodiment according to the present invention, as shown by the block diagram of FIG. 15B for explaining the functions of the configuration of the automated driving system, there is provided a learning permission judgment unit 19 which judges at the time of the manual driving mode whether the running path of the vehicle V falls within a learning permission range which is predetermined in accordance with the driving scene. When it is judged by the learning permission judgment unit 19 that the running path of the vehicle V falls within the learning permission range corresponding to the driving scene, the running path of the vehicle V is adopted as the specific vehicle running path at the driving scene, while when it is judged that the running path of the vehicle V does not fall within the learning permission range corresponding to the driving scene, the running path of the vehicle V is not adopted as the specific vehicle running path.

Further, in the embodiment according to the present invention, a plurality of different driving scenes of the vehicle are preset, and the learning permission ranges are respectively set for the different driving scenes of the vehicle V. In this case, when the driving scene is a driving scene where the host vehicle V is approaching another vehicle A running in front of the host vehicle V and changes lanes to overtake the other vehicle, the learning permission range is the range for the vehicle distance between the host vehicle V and the other vehicle A at the time of the start of change of lanes of the host vehicle V, while when the driving scene is a driving scene where another vehicle A running in front of the host vehicle V stops and the host vehicle V follows behind the other vehicle and stops, the learning permission range is the range for the vehicle distance between the host vehicle V and the other vehicle A when the vehicle stopping action of the host vehicle V is started.

Now then, as explained above, in case where it is judged that the driving scene is a driving scene of overtaking a vehicle, when, as shown in FIG. 10A, the vehicle distance between the host vehicle V and the other vehicle A at the time of the start of change of lanes of the host vehicle V is between the distance DE and the distance DS, that is, is within the learning permission range, and the position of the host vehicle V in the driving lane R2 after the host vehicle V changes lanes to the driving lane R2 is between the limit line HO and the limit line HI, that is, is within the learning permission range, the vehicle running path P is learned. In this case, the learning permission range changes depending on the speed of the host vehicle V, the speed difference $\Delta V$ between the host vehicle V and another vehicle A, the extent of visibility, the weather, and the conditions of the road surface.

For example, the vehicle distance DS and the vehicle distance DE between the host vehicle V and the other vehicle A at the time of the start of change of lanes of the host vehicle V are made longer the higher the speed of the host vehicle V, are made longer the larger the speed difference $\Delta V$ between the host vehicle V and another vehicle A, are made longer the poorer the visibility, are made longer the poorer the weather, and are made longer the more slippery the road surface. In this case, the vehicle distance DS is calculated by multiplying the reference vehicle distance DSO with the coefficient value V(i) corresponding to the speed of the vehicle V, the coefficient value $\Delta V(i)$ corresponding to the speed difference $\Delta V$ between the host vehicle V and another vehicle A, the coefficient value F(i) corresponding to poor visibility, the coefficient value C(i) corresponding to poor weather, and the coefficient value R(i) corresponding to a slippery road surface (DS=DSO·V(i)·$\Delta V$(i)·F(i)·C(i)·R(i)). Similarly, the vehicle distance DE is also calculated by multiplying the reference vehicle distance DEO with the coefficient value V(i) corresponding to the speed of the vehicle V, the coefficient value $\Delta V(i)$ corresponding to the speed difference $\Delta V$ between the host vehicle V and another vehicle A, the coefficient value F(i) corresponding to poor visibility, the coefficient value C(i) corresponding to poor weather, and the coefficient value R(i) corresponding to a slippery road surface (DE=DEO·V(i)·ΔV (i)·F(i) C(i)·R(i))).

These coefficient values V(i), ΔV(i), F(i), C(i), and R(i) are preset as shown in FIG. 16A and are stored in the ROM of the electronic control unit 10. In this case, the coefficient values V(i), ΔV(i), F(i), C(i), and R(i) become larger step by step in small amounts from the left side to the right side in FIG. 16A. The higher the speed of the vehicle V, the larger the speed difference ΔV between the host vehicle V and another vehicle A, the poorer the visibility, the poorer the weather, and the more slippery the road surface, the more to the right side the position of the coefficient value in FIG. 16A used. If giving one example, while the speed of the vehicle V is 0 km to 5 km, the coefficient value V(1) is used, while the speed of the vehicle V is 5 km to 10 km, the coefficient value V(2) is used, and while the speed of the vehicle V is 10 km to 15 km, the coefficient value V(3) is used. Note that, FIG. 16A shows the coefficient values V(i), ΔV(i), F(i), C(i), and R(i) in the case where the driving scene is the driving scene 1 of overtaking the vehicle.

On the other hand, as explained above, when it is judged that the driving scene is a driving scene where the host vehicle V follows behind the other vehicle A and stops, as shown in FIG. 14A, the vehicle running path P is learned when the vehicle distance between the host vehicle V and the other vehicle A at the time of start of the stopping action of the host vehicle V is between the distance DE and the distance DS, that is, is within the learning permission range. In this case, this learning permission range changes depending on the speed of the host vehicle V, the extent of visibility, the weather, and the conditions of the road surface.

For example, in this case as well, the vehicle distance DS and vehicle distance DE between the host vehicle V and the other vehicle A at the time of start of the stopping action of the host vehicle V are made longer the higher the speed of the vehicle V, are made longer the poorer the visibility, are made longer the poorer the weather, and are made longer the more slippery the road surface. In this case, the vehicle distance DS is calculated by multiplying the reference vehicle distance DSO with the coefficient value V(i) corresponding to the speed of the vehicle V, the coefficient value F(i) corresponding to poor visibility, the coefficient value C(i) corresponding to poor weather, and the coefficient value R(i) corresponding to a slippery road surface (DS=DSO·V (i)·F(i)·C(i)·R(i)). Similarly, the vehicle distance DE is also calculated by multiplying the reference vehicle distance DEO with the coefficient value V(i) corresponding to the speed of the vehicle V, the coefficient value F(i) corresponding to poor visibility, the coefficient value C(i) corresponding to poor weather, and the coefficient value R(i) corresponding to a slippery road surface (DE=DEO·V(i)·F(i)·C (i)·R(i)).

These coefficient values V(i), F(i), C(i), and R(i) are preset as shown in FIG. 16B and are stored in the ROM of the electronic control unit 10. In this case, the coefficient values V(i), F(i), C(i), and R(i) become larger in FIG. 16B from the left side toward the right side a little at a time. The higher the speed of the vehicle V, the poorer the visibility, the poorer the weather, and the more slippery the road surface, the more to the right side in FIG. 16B the position of the coefficient value used. Note that, FIG. 16B shows the coefficient values V(i), F(i), C(i), and R(i) in the case where the driving scene is the driving scene 2 for following behind another vehicle A then stopping. Further, in order to change the learning permission range by the speed of the vehicle V, the speed difference ΔV between the host vehicle V and another vehicle A, the extent of visibility, the weather, and the state of the road surface, for example, the external sensor 1 is provided with sensors for detecting the extent of visibility, the weather, and the conditions of the road surface.

Figure 17:
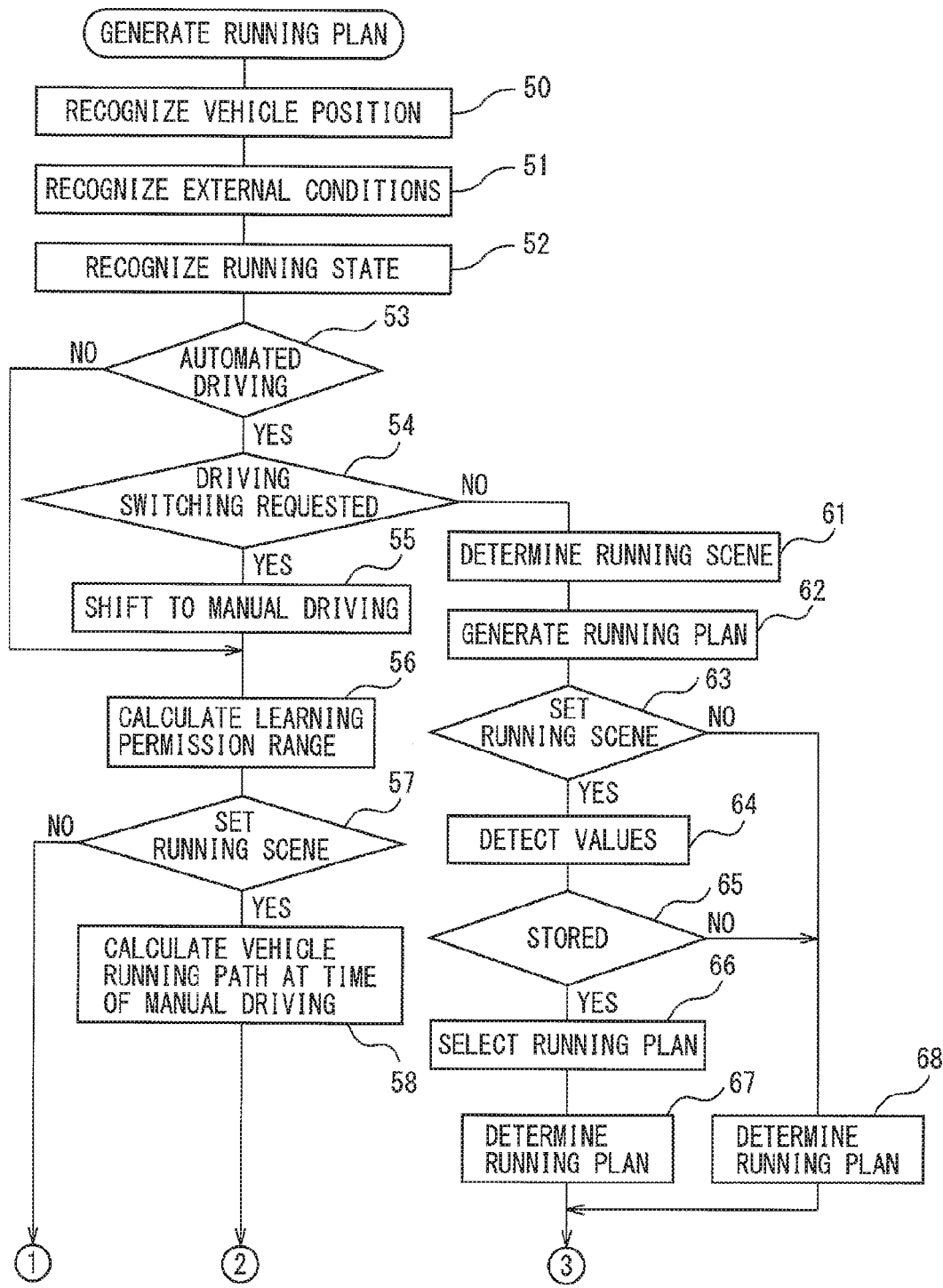
FIG. 17 is a flow chart for generating a driving plan.
Figure 18A:
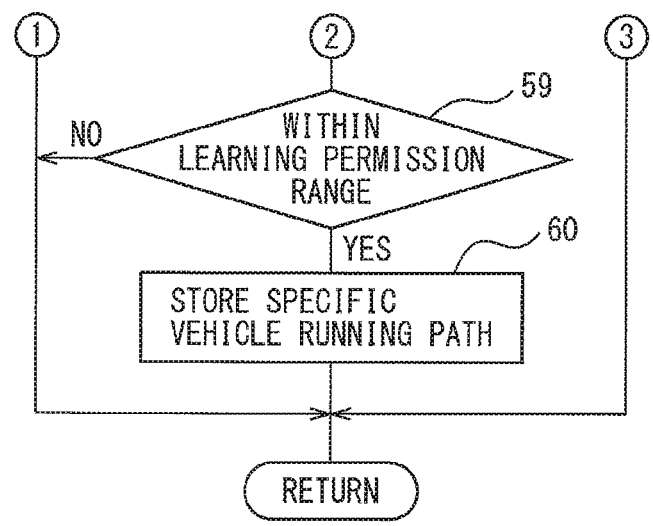
FIGS. 18A and 18B are flow charts for generating a driving plan.
Figure 18B:
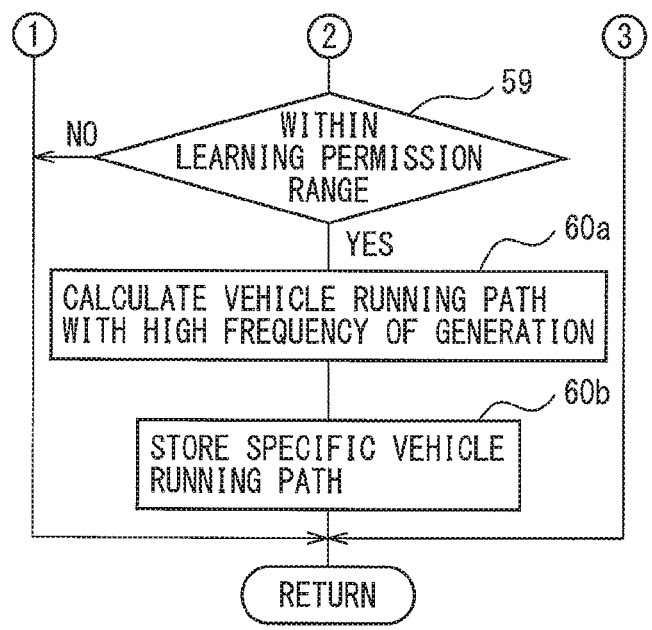

FIG. 17 and FIG. 18A and FIG. 18B show the routine for generating a driving plan for working embodiments of the present invention. This routine for generation of a driving plan is repeatedly executed.

Referring to FIG. 17, first, at step 50, the position of the host vehicle V is recognized by the vehicle position recognition unit 11 based on the position information of the host vehicle V which is received at the GPS reception unit 2. Next, at step 51, the external conditions of the host vehicle V and the accurate position of the host vehicle V are recognized by the external condition recognition unit 12 based on the results of detection of the external sensor 1. Next, at step 52, the running state of the host vehicle V is recognized by the running state recognition unit 13 based on the results of detection of the internal sensor 3.

Next, at step 53, it is judged if the driving mode is the automated driving mode, that is, if automated driving is being performed. When the automated driving is not being performed, that is, at the time of the manual driving mode, the routine proceeds to step 56. On the other hand, when it is judged at step 53 that the automated driving is being performed, the routine proceeds to step 54 where, for example, it is judged if the steering wheel has been turned or the accelerator pedal has been depressed during the automated driving and thereby a request for switching operation from the automated driving mode to the manual driving mode has been issued. When it is judged that the request for switching operation from the automated driving mode to the manual driving mode is issued, the routine proceeds to step 55 where the automated driving mode is switched to the manual driving mode. Next, the routine proceeds to step 56. Therefore, the routine proceeds to step 56 at the time of the manual driving mode, that is, when manual driving is being performed.

At step 56, the learning permission range corresponding to the speed of the host vehicle V, the speed difference ΔV between the host vehicle V and another vehicle A, the extent of visibility, the weather, and the state of the road surface at the different driving scenes is calculated. For example, for the driving scene of overtaking a vehicle, the vehicle distance DS and vehicle distance DE between the host vehicle V and the other vehicle A at the time of the start of change of lanes of the host vehicle V are calculated based on FIG. 16A. That is, the vehicle distance DS is calculated by multiplying the reference vehicle distance DSO with the coefficient values V(i), ΔV(i), F(i), C(i), and R(i) which are shown in FIG. 16A (DS=DSO·V(i)·ΔV(i)·F(i)·C(i)·R(i)), while the vehicle distance DE is also calculated by multiplying the reference vehicle distance DEO with the coefficient values V(i), ΔV(i), F(i), C(i), and R(i) which are shown in FIG. 16A (DE=DEO·V(i)·ΔV(i)·F(i)·C(i)·R(i)).

On the other hand, for the driving scene where the host vehicle V follows behind the other vehicle A then stops, the vehicle distance DS and vehicle distance DE between the host vehicle V and the other vehicle A at the time of start of the action of stopping the host vehicle V are calculated based on FIG. 16B. That is, the vehicle distance DS is calculated by multiplying the reference vehicle distance DSO with the coefficient values V(i), F(i), C(i), and R(i) which are shown in FIG. 16B (DS=DSO·V(i)·F(i)·C(i)·R(i)), while the vehicle distance DE is also calculated by multiplying the reference vehicle distance DEO with the coefficient values V(i), F(i), C(i), and R(i) which are shown in FIG. 16B (DE=DEO·V(i)·F(i)·C(i)·R(i)).

Next, at step 57, the vehicle distance DS which was calculated at step 56 is used as the basis to judge which of the preset driving scenes the driving scene is. When it is judged that the driving scene does not correspond to any of the preset driving scenes, the processing cycle is ended. As opposed to this, when it is judged that the driving scene corresponds to any of the preset driving scenes, the routine proceeds to step 58 where the vehicle running path is found. As explained above, at this time, the vehicle running path is stored in the form of data which shows the position (x(i), y(i)) of the vehicle V and the running state (v(i), θ(i)) of the vehicle V at the times t=iΔt.

Next, at step 59 of FIG. 18A, it is judged if the vehicle running path at the time of this manual driving mode falls within the learning permission range at the corresponding driving scene. When it is judged that the vehicle running path does not fall within the learning permission range at the time of the manual driving mode, the data which shows the position (x(i), y(i)) of the vehicle V and the running state (v(i), θ(i)) of the vehicle V is erased. As opposed to this, when the vehicle driving at the time of the manual driving mode falls within the learning permission range, the routine proceeds to step 60 of FIG. 18A where data which shows the position (x(i), y(i)) of the vehicle V and the running state (v(i), θ(i)) of the vehicle V is stored as showing the specific vehicle running path P corresponding to the driving characteristics of the driver when the coefficient values for the learning permission range are V(i), ΔV(i), F(i), C(i), and R(i), for example, when the coefficient values for the learning permission range are V(8), ΔV(5), F(2), C(3), and R(2).

On the other hand, when at step 54 it is judged that no request for switching operation from the automated driving mode to the manual driving mode is issued, that is, at the time of the automated driving, the routine proceeds to step 61 where the information on the surroundings of the vehicle which is obtained from the results of detection of the external sensor 1 is used as the basis to judge what kind of driving scene the driving scene of the vehicle is, then what kind of driving scene the driving scene of the vehicle is determined. Next, at step 62, the plurality of vehicle running paths PO1, PO2, PO3, and PO4 which show the change along with time of the speed v and advancing direction θ of the vehicle V such as shown in FIG. 13A or FIG. 14B are generated.

Next, at step 63, it is judged if the driving scene which was determined at step 61 is any of the preset driving scenes. When it is judged that the driving scene does not correspond to any of the preset driving scenes, the routine proceeds to step 68 where a single vehicle running path which can reach the destination safely and in the shortest time while observing the law is selected from the plurality of vehicle running paths PO1, PO2, PO3, and PO4. In this case, the vehicle V is automatically driven along this selected vehicle running path.

As opposed to this, when at step 63 it is judged that the driving scene corresponds to one of the preset driving scenes, the routine proceeds to step 64 where the current speed of the vehicle V, the current speed difference ΔV between the host vehicle V and another vehicle A, the current extent of visibility, the current weather, and the current conditions of the road surface are detected and for example the coefficient values V(i), ΔV(i), F(i), C(i), and R(i) for the learning permission range according to the current speed of the vehicle V, the current speed difference ΔV between the host vehicle V and another vehicle A, the current extent of visibility, the current weather, and the current conditions of the road surface are found. Next, at step 65, it is judged for the driving scene which was determined at step 61 whether the vehicle running path P in the manual driving at the current speed of the vehicle V, the current speed difference ΔV between the host vehicle V and another vehicle A, the current extent of visibility, the current weather, and the current conditions of the road surface is stored as the specific vehicle running path which represents the driving characteristics of the driver, for example, whether the vehicle running path P at the time of manual driving when the coefficient values for the learning permission range are V(i), ΔV(i), F(i), C(i), and R(i) is stored as the specific vehicle running path which represents the driving characteristics of the driver.

When it is judged for the driving scene which was determined at step 61 that the vehicle running path P in the manual driving at the current speed of the vehicle V, the current speed difference ΔV between the host vehicle V and another vehicle A, the current extent of visibility, the current weather, and the current conditions of the road surface is not stored as the specific vehicle running path which represents the driving characteristics of the driver, the routine proceeds to step 68 where a single vehicle running path which can reach the destination safely and in the shortest time while observing the law is selected from the plurality of vehicle running paths PO1, PO2, PO3, and PO4. In this case, the vehicle V is automatically driven along this selected vehicle running path.

As opposed to this, at step 65, when it is judged for the driving scene which was determined at step 61 that the vehicle running path P in the manual driving at the current speed of the vehicle V, the current speed difference ΔV between the host vehicle V and another vehicle A, the current extent of visibility, the current weather, and the current conditions of the road surface is stored as the specific vehicle running path which represents the driving characteristics of the driver, for example, when it is judged that the vehicle running path P at the time of manual driving when the coefficient values for the learning permission range are V(i), ΔV(i), F(i), C(i), and R(i) is stored as the specific vehicle running path which represents the driving characteristics of the driver, the routine proceeds to step 66 where for example the vehicle running path closest to the stored specific running path P is selected from the plurality of vehicle running paths PO1, PO2, PO3, and PO4 which were generated at step 62. Next, at step 67, this selected vehicle running path is determined as the specific vehicle running path which represents the driving characteristics of the driver, then the vehicle V is automatically driven along the determined specific vehicle running path which represents the driving characteristics of the driver.

FIG. 18B shows a modification of the part of the routine which is shown in FIG. 18A. In the modification which is shown in FIG. 18B as well, at step 59, when it is judged that the vehicle driving operation at the time of manual driving mode is not within the learning permission range, data which shows the position (x(i), y(i)) of the vehicle V and the running state (v(i), θ(i)) of the vehicle V is erased. On the other hand, when at step 59 it is judged that the vehicle driving operation at the time of the manual driving mode is within the learning permission range, the routine proceeds to step 60a where, in the manner as explained with reference to FIG. 12B, the vehicle running path P with the highest frequency of occurrence is calculated from the plurality of vehicle running paths at the time of the manual driving mode. Next, at step 60*b*, the learned running path P with the highest frequency of occurrence is selected as the specific vehicle running path which represents the driving characteristics of the driver when the values of the coefficients for the learning permission range are V(i), ΔV(i), F(i), C(i), R(i), and data which shows the position (x(i), y(i)) of the vehicle V and the running state (v(i), θ(i)) of the vehicle V of the vehicle running path P with the highest frequency of occurrence is stored.

What is claimed is:

1. A control system of an automated driving vehicle comprising (A) an external sensor which detects information of surroundings of a host vehicle, a storage device which stores map information, and an electronic control unit, said electronic control unit comprising:
   (B) a driving plan generation unit which generates a plurality of vehicle running paths which show changes along with time of a speed and advancing direction of the host vehicle based on the map information stored in the storage device and the information of surroundings of the host vehicle which is detected by the external sensor and decides on a single vehicle running path from among these plurality of vehicle running paths,
   (C) a driving scene judgment unit which determines a driving scene of the vehicle based on the information of the surroundings of the host vehicle which is detected by the external sensor,
   (D) a driving mode switching unit which switches a driving mode of the host vehicle between a manual driving mode where the vehicle is driven by operations of a driver and an automated driving mode where the vehicle is driven without operations of the driver, and
   (E) a storage unit which stores a running path of the host vehicle in a preset driving scene at the time of the manual driving mode as a specific vehicle running path which includes driving characteristics of the driver in said preset driving scene,
   (F) at the time of the automated driving mode, said driving plan generation unit selecting a vehicle running path from the plurality of vehicle running paths when the driving scene becomes a driving scene for which the specific vehicle running path which includes the driving characteristics of the driver is stored in such a way that the selected vehicle running path is closer to the specific vehicle running path compared with the single vehicle running path which is determined by the driving plan generation unit when the driving characteristics of the driver are not included, and said driving plan generation unit making the host vehicle be automated driven along with the selected vehicle running path.

2. The control system of an automated driving vehicle as claimed in claim 1, where said preset driving scene is a driving scene where the host vehicle approaches another vehicle which is running in front of the host vehicle and changes lanes to overtake the other vehicle.

3. The control system of an automated driving vehicle as claimed in claim 1, where said preset driving scene is a driving scene where another vehicle which is running in front of the host vehicle stops and the host vehicle follows behind the other vehicle and stops.

4. The control system of an automated driving vehicle as claimed in claim 1, wherein said electronic control unit further comprises a learning permission judgment unit which judges if the running path of the host vehicle falls within a learning permission range which is preset corresponding to the driving scene at the time of the manual driving mode, and wherein when said learning permission judgment unit judges that the running path of the host vehicle falls within said learning permission range corresponding to the driving scene, the running path of the host vehicle is employed as said specific vehicle running path at this driving scene and when it judges that the running path of the host vehicle does not fall within said learning permission range corresponding to the driving scene, the running path of the host vehicle is not employed as said specific vehicle running path.

5. The control system of an automated driving vehicle as claimed in claim 4, wherein a plurality of different driving scenes of the vehicle are preset and said learning permission range is set for the different driving scenes of the host vehicle.

6. The control system of an automated driving vehicle as claimed in claim 4, wherein when said driving scene is a driving scene where the host vehicle approaches another vehicle which is running in front of the host vehicle and changes lanes to overtake the other vehicle, said learning permission range is a range regarding the vehicle distance between the host vehicle and the other vehicle when the host vehicle starts to change lanes, and when said driving scene is a driving scene where another vehicle which is running in front of the host vehicle stops and the host vehicle follows behind the other vehicle and stops, said learning permission range is a range regarding the vehicle distance between the host vehicle and the other vehicle when the host vehicle starts the stopping action of the vehicle.

* * * * *